(12) United States Patent
Efstathiou et al.

(10) Patent No.: US 7,105,137 B2
(45) Date of Patent: Sep. 12, 2006

(54) CATALYST FOR THE REDUCTION OF NO TO $N_2$ WITH HYDROGEN UNDER NOX OXIDATION CONDITIONS

(75) Inventors: Angelos M. Efstathiou, Nicosia (CY); Costas N. Costa, Nicosia (CY); José Luis Garcia Fierro, Madrid (ES)

(73) Assignees: Consejo Superior de Investigaciones Cientificas, Madrid (ES); Universidad de Chipre, Nicosia (CY)

( * ) Notice: Subject to any disclaimer, the term of this patent is extended or adjusted under 35 U.S.C. 154(b) by 0 days.

(21) Appl. No.: 10/915,961

(22) Filed: Aug. 11, 2004

(65) Prior Publication Data

US 2005/0090393 A1    Apr. 28, 2005

Related U.S. Application Data

(63) Continuation of application No. PCT/ES03/00083, filed on Feb. 14, 2003.

(30) Foreign Application Priority Data

Feb. 15, 2002   (ES)   ............... 200200368

(51) Int. Cl.
 *B01J 23/00* (2006.01)
 *B01J 23/42* (2006.01)
 *B01J 23/44* (2006.01)
 *B01J 21/04* (2006.01)
 *B01J 8/00* (2006.01)

(52) U.S. Cl. .................. 423/239.1; 502/326; 502/328; 502/304; 502/340; 502/439; 502/339

(58) Field of Classification Search ................ 502/325, 502/326, 328, 304, 339, 340, 439; 423/239.1
See application file for complete search history.

(56) References Cited

U.S. PATENT DOCUMENTS 2,525,073 A * 10/1950 Kimberlin, Jr. ............. 502/304

(Continued)

FOREIGN PATENT DOCUMENTS

EP       0 838 255 A2     4/1998

(Continued)

OTHER PUBLICATIONS

Costa, CN, et al., An Investigation of the $NO/H_x/O_x/$ (Lean-deNO$_x$) Reaction on a Highly Active and Selective $Pt/La_{0.5}Ce_{0.5}MnO_3$ Catalyst, 2001, Journal of Catalysis, 197,350-364.

(Continued)

*Primary Examiner*—Cam N. Nguyen
(74) *Attorney, Agent, or Firm*—Klauber & Jackson

(57) ABSTRACT

The invention relates to a novel catalyst having excellent activity, selectivity and stability for reducing nitric oxide to gas nitrogen, with hydrogen being used as a reducing agent, in the low temperature range 100–200° C. and in the presence of an excess of oxygen (e.g. 5% vol), $H_2O$ (5% vol) and/or $SO_2$ (20 ppm) in the supply. The inventive catalyst consists of platinum crystals which are in contact with the phases of a mixed MgO and $CeO_2$ medium or in the form of platinum supported on the mixed MgO—$CeO_2$ medium which has already been sulphated in a selective manner. The Pt/MgO—$CeO_2$ catalyst can be used to obtain NO conversion levels which are greater than 40% and nitrogen selectivity values of greater than 80% under NOx oxidation conditions in the 100–400° C. temperature range and for a surface contact time of 0.045 s. In particular, full NO conversion is obtained as well as $N_2$ selectivity levels of 83% at 150° C. with a reaction mixture of 0.25% NO/1% $H_2$/5% $O_2$/5% $H_2O$/He.

8 Claims, 9 Drawing Sheets

U.S. PATENT DOCUMENTS

| | | | | |
|---|---|---|---|---|
| 2,742,437 | A * | 4/1956 | Houdry | 502/262 |
| 4,239,656 | A * | 12/1980 | Fujitani et al. | 502/200 |
| 4,274,981 | A * | 6/1981 | Suzuki et al. | 502/178 |
| 4,492,769 | A * | 1/1985 | Blanchard et al. | 502/262 |
| 4,760,044 | A * | 7/1988 | Joy et al. | 502/303 |
| 4,857,499 | A | 8/1989 | Ito et al. | |
| 4,977,129 | A * | 12/1990 | Ernest | 502/330 |
| 5,157,007 | A * | 10/1992 | Domesle et al. | 502/66 |
| 5,968,870 | A * | 10/1999 | Iizuka et al. | 502/325 |
| 6,395,675 | B1 * | 5/2002 | Suga et al. | 502/326 |
| 6,511,642 | B1 * | 1/2003 | Hatanaka et al. | 423/239.1 |
| 6,514,905 | B1 * | 2/2003 | Hanaki et al. | 502/328 |
| 6,620,392 | B1 * | 9/2003 | Okamoto et al. | 423/213.5 |
| 6,797,668 | B1 * | 9/2004 | Yoshikawa | 502/304 |
| 6,866,834 | B1 * | 3/2005 | Nakamura et al. | 423/239.1 |
| 6,926,875 | B1 * | 8/2005 | Hatanaka et al. | 423/239.1 |
| 6,933,259 | B1 * | 8/2005 | Hatanaka et al. | 502/240 |
| 2001/0036433 | A1 * | 11/2001 | Euzen et al. | 423/245.3 |
| 2002/0090512 | A1 * | 7/2002 | Hatanaka et al. | 428/402 |
| 2003/0078162 | A1 * | 4/2003 | Martin et al. | 502/407 |

FOREIGN PATENT DOCUMENTS

| | | |
|---|---|---|
| WO | WO 91/08827 | 6/1991 |
| WO | WO 97/02886 | 1/1997 |

OTHER PUBLICATIONS

G. Busca, L. Lietti, G. Ramis and F. Berti, Appl. Catal. B 18 (1998) 1.
C.J. Pereria and K.W. Phumlee, Catal. Today 13 (1992) 23.
A. Fritz and V. Pitchon, Appl. Catal B 13 (1997) 1.
R.I. Pusateri, J.R. Katzer and W.H. Monaque, AICHE J. 20 (1974) 219.
T. Tabata, M. Kokitsu and O. Okada, Catal. Today 22 (1994) 147.
V.I. Parvulescu, P. Grange and B. Delmon, Catal. Today 46 (1998) 233.
A. Obuchi, A. Ohi, M. Nakamura, A. Ogata, K. Mizuno and H. Ohuchi, Appl. Catal. B 2 (1993) 71.
R. Burch, P.J. Millington and A.P. Walker, Appl. Catal. B 4 (1995) 65.
R. Burch, J.A. Sullivan and T.C. Watling, Catal. Today 42 (1998) 65.
R. Burch and A. Ramli, Appl. Catal. B 15 (1998) 63.
M.D. Amiridis, K.L. Roberts and C.J. Perreira, Appl. Catal. B 14 (1997) 203.
G.R. Bamwenda, A. Ogata, A. Obuchi, J. Oi, K. Mizuno and J. Skrzypek, Appl. Catal. B 2 (1993) 71.
E.A. Efthimiades, S.C. Christoforou, A.A. Nikolopoulos and I.A. Vasalos, Appl. Catal. B: Envir. 22 (1999) 91.
E. Seker, J. Cavatio, E. Gulari, P. Lorpongpaiboon and S. Osuwan, Appl. Catal. A 183 (1999) 121.
H. Hirabayashi, H. Yahiro, N. Mizuno and M. Iwamoto, Chem. Lett. (1992) 2235.
G. Zhang, T. Yamaguchi, H. Kawakami and T. Suzuki, Appl. Catal. B: Envir. 1 (1992) L1519.
F.J. Janssen, in G. Ertl, H. Knözinger and J. Weitkamp (Eds.), Handbook of Heterogeneous Catalysis, VCH, Weinheim (1997) p. 1633.
B. Rausenberger, W. Swiech, A.K. Schmid, C.S. Rastomjee, W.Emgel and A.M. Bradshaw, J. Chem. Soc., Faraday Trans. 94(7) (1998) 963.
K. Tomishige, K. Asakura and U. Iwasawa, J. Catal. 157 (1995) 472.
W.C. Hecker and A.T. Bell, J. Catal. 92 (1985) 247.
A. Hornung, M. Muhler and G. Ertl. Catal. Lett. 53 (1998) 77.
T.P. Kobylinski and B.W. Taylor, J. Catal. 33 (1974) 376.
S.J. Huang, A.B. Walters and M.A. Vannice, J. Catal. 173 (1998) 229.
R. Burch and S. Squire, Catal. Lett. 27 (1994) 177.
T.M. Salama, R. Ohnishi, T. Shido and M. Ichikawa, J. Catal. 162 (1996) 169.
T. Tanaka, K. Yokota, H. Doi and M. Sugiura, Chem. Lett. (1997) 273.
A. Lindsteld, D. Strömberg and M.A. Milh, Appl. Catal. 116 (1994) 109.
D. Ferri, L. Forni, M.A.P. Dekkers and B.E. Nieuwenhuys, Appl. Catal. B: Envir. 16 (1998) 339.
J.R. Rostrup-Nielsen, Catal. Today 18 (1993) 305.
I. Alstrup, J. Catal. 109 (1998) 241.
S.T. Ceyer, Q.Y. Yang, M.B. Lee, J.D. Beckerle and A.D. Johnson, Stud. Surf. Sci. Catal. 36 (1987) 51.
I. Alstrup and M.T. Travers, J. Catal. 135 (1992) 147.
T.B. Beebe, Jr., D.W. Goddman, B.D. Kay and T.J. Yates, Jr., J. Chem. Phys. 87 (1987) 2305.
I. Alstrup, I. Chorkendorff and S. Ullmann, Surf. Sci. 234 (1990) 79.
S. Tenner, Hydrocarbon Processing 66(7) (1987) 42.
A.T. Ashcroft, A.K. Cheetham, M.L.H. Green and P.D.F. Vernon, Nature 352 (1991) 225.
J.T. Richardson and S.A. Paripatyadar, Appl. Catal. 61 (1990) 293.
I.M. Bodrov and L.O. Apel'baum, Kinet. Katal. 8 (1967) 379.
I.M. Bodrov and L.O. Apel'baum, Kinet. Katal. 5 (1964) 696.
M.A. Peña, J.P. Gomez and J.L.G. Fierro, Appl. Catal. A: Chemical 144 (1996) 7.
B. Frank, G. Emig and A. Renken, Appl. Catal. B: Envir. 19 (1998) 45.
R. Burch, M.D. Coleman, Appl. Catal. B. Envir. 23 (1999) 115.
A. Ueda, T. Nakao, M. Azuma and T. Kobayashi, Catal. Today 45 (1998) 135.
K. Yokota, M. Fukui and T. Tanaka, Appl. Surf. Sci. 121/122 (1997) 273.
M. Machida, S. Ikeda, D. Kurogi and T. Kijima, Appl. Catal. B: Envir. 35 (2001) 107.
R. Burch, P.J. Millington and A.P. Walker Appl. Catal. B: Envir. 4 (1994) 160.
C.N. Costa, V.N. Stathopoulos, V.C. Belessi and A.M. Efstathiou, J. Catal. 197 (2001) 350.
G. Centi, J. Mol. Catal. A: Chemical 173 (2001) 287.
B. Ramachandran, G.R. Herman, S. Choi, H.G. Stenger, C.E. Lyman and J.W. Sale, Catal. Today 55 (2000) 281.
R. Khodayari and C.U.I. Odenbrand, Appl. Catal. B: Envir. 33 (2001) 277.
K. Balakrishnan and R.D. Gonzalez, J. Catal. 144 (1993) 395.
C.N. Costa, P.G. Savva, C. Andronikou, G. Lambrou, K. Polychronopoulou, V.N. Stathopoulos, V.C. Belessi, P.J. Pomonis and A.M. Efstathiou, J. Catal. in press.
S. Kikuyama, I. Matsukama, R. Kikuchi, K. Sasaki and K. Eguchi, Appl. Catal. A: General 5480 1 (2001).
S. Hodjati, C. Petit, V. Pitchon and A. Kiennemann, Appl. Catal. B: Envir. 30 (2001) 247.
V.C. Belessi, C.N. Costa, T.V. Bakas, T. Anastasiadou, A.M. Efstathiou and P.J. Pomonis, Catal. Today 59 (2000) 347.
G. Busca et al, Appl. Catal. B 18 (1998).
A. Fritz et al, Appl. Catal. B 13 (1997).
V.I. Parvulescu et al, Catal. Today 46 (1998).

D.K. Captain et al, Catal. Today 42 (1998).
R. Burch et al, Catal. Today 42 (1998).
R. Burch et al, Appl. Catal. B 15 (1998).
M.D. Amiridis et al, Appl. Catal. B 14 (1997).
G.R. Bamwenda et al, Appl. Catal. B: Environmental 6 (1995).
E.A. Efthimiades et al, Appl. Catal. B: Envir. 22 (1999).
E. Seker et al, Appl. Catal. A 183 (1999).
K. Tomishige et al, Catal. 157 (1995).
S.J. Huang et al, Catal. 173 (1998).
T.M. Salama et al, J. Catal. 162 (1996).
D. Ferri et al, Appl. Catal. B: Envir. 16 (1998).
T.B. Beebe, Jr., et al, J. Chem. Phys. 87 (1987).
M.A. Pena et al, Appl. Catal. A:General 144 (1996).
B. Frank et al, Appl. Catal. B: Envir. 19 (1998).
R. Burch et al, Appl. Catal. B. Envir. 23 (1999).
A. Ueda et al, Catal. Today 45 (1998).
K. Yokota et al, Appl. Surf. Sc. 121/122 (1997).
M. Machida et al, Appl. Catal. B: Envir. 35 (2001).
C.N. Costa et al, J. Catal. 197 (2001).
G. Centi, J. Mol. Catal. A: Chemical 173 (2001).
B. Ramachandran et al, Catal. Today 55 (2000).
R. Khodayari et al, Appl. Catal. B: Envir. 33 (2001).
K. Balakrishnan et al, J. Catal. 144 (1993).
C.N. Costa et al, J. Catal. 209 (2002).
S. Kikuyama et al, Appl. Catal. A: General 219 (2001).
S. Hodjati et al, Appl. Catal. B: Envir. 30 (2001).
V.C. Belessi et al, Catal. Today 59 (2000).

* cited by examiner

CATALYST FOR THE REDUCTION OF NO TO $N_2$ WITH HYDROGEN UNDER NOX OXIDATION CONDITIONS

RELATED APPLICATIONS

The present application is a Continuation of co-pending PCT Application No. PCT/ES03/00083, filed Feb. 14, 2003 which in turn, claims priority from Spanish Application Serial No. P200200368, filed on Feb. 15, 2002. Applicants claim the benefits of 35 U.S.C. §120 as to the PCT application and priority under 35 U.S.C. §119 as to said Spanish application, and the entire disclosures of both applications are incorporated herein in their entireties.

FIELD OF THE TECHNIQUE

This invention refers to a novel catalyst based on platinum, with excellent activity, stability and selectivity for reducing NO to $N_2$ by using $H_2$ as reducing agent in the low temperature range 100–200° C. and in the presence of an excess of oxygen (e.g. 5% vol), 5% vol $H_2O$ and/or 20 ppm $SO_2$ in the reactor supply.

This catalyst can be used in the selective conversion of nitric oxide, produced in many industrial combustion processes, to $N_2$ gas. It is known that hydrogen is available in numerous industrial installations. Using the said catalyst, just a very small percentage of the available hydrogen is necessary for the reduction of NO to $N_2$ under clearly oxidizing conditions of NOx in the low temperature range 100–200° C.

The selective catalytic reduction of NO with $NH_3$ ($NH_3$—SCR) in the presence of an excess of oxygen has aroused great interest in the last three decades and has recently been reported and revised in the literature [1]. In this process, ammonia is used as reducing agent of nitrogen oxides and nitrogen and water are produced as the reaction products. Vanadium pentoxide ($V_2O_5$) supported on oxides such as $TiO_2$, $Al_2O_3$ and $SiO_2$ and promoted with $WO_3$ constitutes an efficient catalyst used in industry [2]. This catalyst is active in the temperature range 250–550° C. [3]. Nevertheless, the toxicity and problems of handling ammonia [1,4] constitute the main obstacles preventing the use of this technology by the general public, and at the same time it seems that problems deriving from spillages of $NH_3$ and corrosion and poisoning of the catalyst by $SO_2$ cannot be solved with current technology. The automobile industry never applied the $NH_3$—SCR process. This is primarily due to the absence of $NH_3$ in the exhaust gases of automobiles and the marked deactivation of the $NH_3$—SCR catalyst ($V_2O_5$—WO3/$TiO_2$) in the presence of excess oxygen in the reaction stream [5] (as in the case of automobiles with diesel engines).

Nevertheless, the $NH_3$—SCR process is the best catalytic technology known for the elimination of NO in stationary sources and it is used as a decontamination process primarily in conventional thermal power stations.

The selective catalytic reduction of NO with hydrocarbons (HC—SCR) has been exhaustively studied in recent years as a potential competitor of the $NH_3$—SCR process [6,7]. The main advantage of this catalytic reaction is the potential use of hydrocarbons as reducing species that can be found in the exhaust gases of combustion processes operating under clearly oxidizing conditions of NOx. The catalysts that have attracted the attention for the HC—SCR process of NO can be divided into three main groups: (a) supported noble metals; (b) zeolites exchanged with metal ions; and (c) metal oxide catalysts [3]. Among these materials, supported noble metals have shown the best and only catalytic behaviour for the reduction of NO with hydrocarbons under oxidation conditions at reaction temperatures as low as 120–250° C. [8–16]. Also, it was found that these catalysts are more resistant to deactivation in the presence of water and/or $SO_2$ [17,18]. Nevertheless, in spite of their exceptional activity in this low temperature region, supported Pt and Pd catalysts present low values of selectivity towards $N_2$ [19,20] and a relatively narrow range of operating temperatures. On the contrary, zeolites exchanged with metal ions are very active and selective for the SCR of NO with hydrocarbons at relatively low temperatures. However, these catalysts present an even narrower operating temperature range compared to that of supported noble metals. Also, the activity of zeolitic catalysts exchanged with metal ions drastically diminishes in the presence of water. Finally, catalysts based on metal oxides showed low activity but high selectivity towards $N_2$ for HC—SCR processes of NO but at temperatures above 500° C.

Current concerns regarding carbon dioxide emissions into the atmosphere and the problems resulting from the use of $NH_3$ as reducing agent [21] have encouraged a search for suitable molecules different from hydrocarbons for the catalytic reduction of NO in gaseous currents coming from combustion. It has been reported that hydrogen is a very energetic reducing agent for the reaction NO/$H_2$ [22–33] and can potentially be used for reducing $NO_x$ emissions coming from stationary combustion sources. Hydrogen is currently used in industrial processes of petroleum refining such as hydrotreatment and hydrocracking [34–36], the production of methanol [37,38], the conversion of methanol to gasoline [39,40] and the synthesis of ammonia [41,42] and hydrocarbons (Fischer-Tropsch process) [43–45]. So, hydrogen is available in many industrial installations wherein various processes are operated requiring a heat input. To this must be added the progressive demand for hydrogen with a growth rate of approximately 10% a year [46], which means that the availability in the industrial sector will be increasing further in the coming years.

Therefore, an $H_2$—SCR catalytic technology of $NO_x$ can be considered as an important qualitative leap compared to $NH_3$—SCR and HC—SCR catalytic processes.

It is important to mention here that in the absence of oxygen in the supply stream hydrogen cannot be regarded as a selective reducing agent due to the fact that as well as nitrogen, other undesired products are usually produced such as $N_2O$ and $NH_3$. Just a few attempts have been reported to reduce NO with $H_2$ under oxygen-rich conditions [47–51] and this is due to the fact that hydrogen displays high combustion velocities with $O_2$ for forming $H_2O$ under the applied reaction conditions. The strong competition among species of NOx and oxygen adsorbed by the hydrogen under the applied reaction conditions [52,53] makes the development of suitable catalytic systems a difficult task.

It has been found that platinum supported catalysts, such as Pt/$Al_2O_3$ and Pt/$SiO_2$, are the most active for the reaction NO/$H_2$/$O_2$ under clearly oxidizing conditions of NOx at low temperature (T<200° C.) [47–51]. Yokota et al [50] reported catalytic activity results in the reduction of NO with $H_2$ in the presence of $O_2$ on a Pt—Mo—Na/$SiO_2$ catalyst, while Frank et al [47] reported kinetic results of the reaction NO/$H_2$/$O_2$ on a Pt—Mo—Co/α-$Al_2O_3$ catalyst. The last two catalysts produced substantially lower quantities of $N_2O$ (selectivity to $N_2$ close to 75%) than the conventional Pt supported catalysts (e.g., Pt/$Al_2O_3$, $SiO_2$), which present lower selectivity levels to $N_2$ ($S_{N2}$=40–60%). On the other hand, it has been documented [50] that the catalyst Pt—Mo—Na/SiO$_2$ presents a relatively low stability under clearly oxidizing conditions in the presence of water, while the catalysts Pt—Mo—Na—/SiO$_2$ and Pt—Mo—Co/α-Al$_2$O$_3$ present a relatively narrow operating temperature range. In a previous work [54] we have reported reduction results of NO with H$_2$ in the presence of excess O$_2$, obtained on a platinum catalyst supported on a perovskite type substrate. This catalyst turned out to be the most active and selective of the platinum supported catalysts reported in the literature for the reaction NO/H$_2$/O$_2$ up to the date of publication. In spite of the fact that the catalyst Pt/La—Ce—Mn—O [54] turned out to be very active and selective in a wide temperature range compared to other platinum based catalysts, this operating temperature range becomes much lower than that shown by the catalyst Pt/MgO—CeO$_2$.

The results described above reflect the general agreement of scientists that the support has a crucial effect on the activity and selectivity of platinum supported catalysts in the reduction of NO with H$_2$ in the presence of an excess of oxygen [7].

On the basis of everything that has been stated, it is of industrial interest to develop an improved catalyst based on platinum with the following characteristics for the reaction NO/H$_2$/O$_2$:

(a) High activity and selectivity at low reaction temperatures (e.g. below 200° C.) with N$_2$ yields greater than 90%.
(b) A broad operating temperature range (e.g. 100–200° C.) with appreciable values of NO conversion and selectivity to N$_2$.
(c) Prolonged stability during the course of the operation.
(d) Stability in the presence of at least 5% vol H$_2$O and SO$_2$ in the range 1–20 ppm.

DESCRIPTION OF THE INVENTION

This invention describes a novel catalyst based on platinum, with excellent activity, selectivity and stability for reducing nitric oxide using hydrogen as reducing agent in the low temperature range 100–200° C. and in the presence of an excess of oxygen. The catalyst consists of platinum crystals in contact with the two phases of MgO and CeO$_2$ or in the form of platinum supported on a MgO—CeO$_2$ mixed oxide support previously sulphated in a selective manner. Prior to the impregnation of the oxide phases with the platinum precursor, the pre-sulphation of the support (50% MgO—CeO$_2$) is necessary. This is achieved by impregnation of the support with an aqueous solution of NH$_4$NO$_3$ followed by (NH$_4$)$_2$SO$_4$ as described in Example 1. Calcination of the resulting solid in air at 600° C. for at least 2 h is necessary for the complete elimination of the ammonium cation and stabilization of the surface structure of the support. The catalyst 0.1% wt Pt/50% MgO—CeO$_2$ can be prepared by any of the means known by practitioners of this art, including the technique of damp impregnation of the pre-sulphated support with an aqueous solution of the Pt precursor (e.g., solution of hexachloroplatinic acid (H$_2$PtCl$_6$)). Following the preparation of the Pt supported catalyst at least 2 h of calcination in air at 600° C. are necessary for the complete transformation of the platinum precursor into platinum oxide. Finally, a reduction has to be carried out with hydrogen at 300° C. for at least 2 h in order to fully reduce the platinum oxide to metallic platinum. The resulting catalytic surface is very stable, without any deactivation being observed during 24 h of reaction or more, even in the presence of 5% vol H$_2$O and/or 20 ppm SO$_2$. Hereinafter, the catalyst described above will be known as Pt/s-MgO—CeO$_2$ where s indicates the sulphated support 50% MgO—CeO$_2$. Virtually complete conversion of NO is obtained at 150° C. on this catalyst in a contact time of 0.045 s. The industrial reactors of NH$_3$—SCR of NO which use industrial catalysts operate under typical surface contact times of 0.08–0.4 s [1,55–57]. By means of applying this new catalyst based on Pt (e.g., 0.1% wt Pt/s-50% MgO—CeO$_2$) the conversion of NO to N$_2$ with H$_2$ under clearly oxidizing conditions of NOx can be considered at a broader scale.

This invention describes a novel catalyst based on platinum, with excellent activity, selectivity and stability for reducing nitric oxide to nitrogen using hydrogen as reducing agent in the low temperature range 100–200° C. and in the presence of an excess of oxygen, 5% vol H$_2$O and/or 20 ppm SO$_2$ in the supply. The catalyst was prepared by the damp impregnation method previously described above. Identical catalysts can be prepared using other preparation techniques known by practitioners of this art, and other metallic precursors such as platinum nitrate, platinum acetyl-acetonate, platinum chloride, etc. Nevertheless, it has been found in this work that the preparation of the catalyst mentioned above using the sol-gel method [58] provided better results in terms of catalytic activity and selectivity to N$_2$ in the reaction NO/H$_2$/O$_2$ (see FIG. 3). Eight different mixtures of MgO—CeO$_2$ were used as supports with a magnesium content (x% wt MgO) varying from 0 to 100%.

In this work it was found that the pre-sulphated MgO—CeO$_2$ mixed oxide (see Example 1) is essential for achieving high stability towards deactivation by SO$_2$ (Example 8, FIG. 7). It must be noted here that the non-sulphated catalyst 0.1% wt Pt/MgO—CeO$_2$ showed selectivity values towards N$_2$ in the range 65–72%, while the pre-sulphated catalyst showed higher selectivity values towards N$_2$ (greater than 80%, see Example 6 and FIG. 5).

In this work it was also found that the nature of the support has a large effect on the activity and selectivity of the corresponding Pt supported catalyst. While Pt supported on SiO$_2$ presents selectivity values lower than 60% [59], the catalyst Pt/s-50% MgO—CeO$_2$ exhibits selectivities higher than 80%. Also, the integral production velocity of nitrogen obtained on the catalyst Pt/s-50% MgO—CeO$_2$ is slightly higher than that found with the catalyst Pt/La$_{0.5}$Ce$_{0.5}$MnO$_3$ [54] though close to 50% higher than that obtained on Pt/SiO$_2$ [59]. Nevertheless, the catalyst Pt/s-50% MgO—CeO$_2$ presents an extraordinarily broad operating temperature range (ΔT, see Table 1), much broader than that obtained on the catalysts Pt/SiO$_2$ and Pt/La$_{0.5}$Ce$_{0.5}$MnO$_3$. It must be noted that the last catalyst is the most active and selective of all the ones reported for the reaction NO/H$_2$/O$_2$ under NOx oxidation conditions [54]. The integral production velocity of nitrogen on the catalyst Pt/MgO—CeO$_2$ can even be raised by means of increasing the partial pressure of hydrogen. In particular, the integral production velocity of N$_2$ on the said catalyst can be raised up to almost four times when the partial pressure of H$_2$ is increased from 1 to 3% vol at 200° C. (Example 9, FIG. 8).

The ratio of MgO to CeO$_2$ is an important factor which affects the catalytic behaviour (reaction velocity and selectivity) of the catalyst Pt/MgO—CeO$_2$. It is shown (see Example 2, FIG. 1) that the catalyst with a weight ratio of MgO to CeO$_2$ equal to one presents the highest integral production velocity of N$_2$ at both low and high reaction temperatures. As shown in FIG. 1, almost all the compositions present higher velocities than those predicted by the rule of mixture (dotted line) at 150° C. (Example 2, Eq. [1]).

So, a positive synergetic effect results. Nevertheless, when the reaction temperature rises to 300° C., the behaviour of the reaction velocity toward the content of MgO is different (FIG. 1). All the catalysts except Pt/50% MgO—$CeO_2$ present experimental velocities substantially lower than those expected from the law of mixture (a negative synergetic effect is seen). In the case of the catalyst Pt/50% MgO—$CeO_2$ an important positive synergetic effect is obtained at both temperatures.

The platinum content of the catalyst Pt/MgO—$CeO_2$ is a crucial factor affecting its catalytic behaviour. As was shown in FIG. 2 (see also Example 3), the catalyst with least metallic content (0.1% wt) presents the highest integral reaction velocity referring to a gram of metallic Pt, compared to that of catalysts with higher metallic contents. The formation reaction velocity of $N_2$ decreases with an increase in the platinum content. Since catalysts with low metal contents have high dispersions, it can be concluded that the reduction reaction of NO with $H_2$ in the presence of excess $O_2$ occurs favourably on the surface of small metallic particles. Galvano and Paravano [60] reported very similar results on different gold supported catalysts for the reaction NO/$H_2$. These authors found that the selectivity of the reaction NO/$H_2$ towards $N_2$ decreased with the increase of the particle size of the gold for catalysts supported on MgO and $Al_2O_3$.

The catalyst Pt/s-50% MgO—$CeO_2$ showed excellent stability with the reaction time in the presence of 5% vol $H_2O$ in the supply (Example 7, FIG. 6), which is higher than that observed with the catalysts Pt/$SiO_2$ and Pt/$La_{0.5}Ce_{0.5}MnO_3$ previously investigated [54,59]. Constant production velocities of $N_2$ were observed even after 24 h in current on the catalyst 0.1% wt Pt/s-50% MgO—$CeO_2$. On the other hand, the integral production velocity of $N_2$ obtained with the catalysts Pt/$La_{0.5}Ce_{0.5}MnO_3$ and Pt/$SiO_2$ fell substantially during the first 2 hours in current and continued to fall, though more slowly, during longer times in stream (FIG. 6). This is typical behaviour of many NOx catalysts that have been reported when water is present in the supply stream [3], which means that the catalytic stability results reported here are of major practical importance.

As noted above, the fresh catalyst Pt/MgO—$CeO_2$ becomes deactivated in the presence of 20 ppm $SO_2$ in the supply stream (FIG. 7). This is a well-known phenomenon in NOx catalysts. The deactivation of the catalyst Pt/MgO—$CeO_2$ probably occurs by adsorption and reaction of gaseous $SO_2$ with the oxide phases of the catalyst, giving rise to a progressive sulphation of the support (e.g., $MgSO_4$, $Ce_2(SO_4)_3$). These processes in turn probably cause an irreversible poisoning of the active centres due to the formation of nitrate/nitrite according to the literature [51,61]. Nevertheless, when the support MgO—$CeO_2$ is pre-sulphated beforehand (see Example 1 and FIG. 7) the catalyst Pt/s-MgO—$CeO_2$ presents excellent stability in the presence of $SO_2$. This implies that during the pre-sulphation of the support, the nitrate/nitrite formation centres do not become poisoned and the adsorption of $SO_2$ occurs selectively on centres that are non-active for the reaction NO/$H_2$/$O_2$ under NOx oxidation conditions. Moreover, it is possible that the adsorption of $SO_2$ in those centres also inhibits the later sulphation of the support and the development of the crystalline phases $MgSO_4$ and/or $Ce_2(SO_4)_3$ under reaction conditions. The effective sulphation of the solid MgO—$CeO_2$ can also be assured by damp impregnation of the original sample with a nitrate solution. The results obtained in this case are the same as those described above. Hodjati et al [62] also reported a similar behaviour on a catalyst of NOx $BaSnO_3$.

The present invention, e.g., the pre-sulphated catalyst 0.1% Pt/s-50% MgO—$CeO_2$, is a novel catalyst wherein the main differences with respect to catalysts based on noble metals and other catalysts of NOx reported for the reaction NO/$H_2$/$O_2$ are as follows:

Catalysts based on noble metals have a high cost and limited availability of the noble metal. Nevertheless, owing to the high activity of the new catalyst Pt/s-MgO—$CeO_2$ (Table 1) much lower platinum contents can be used (e.g., 0.1% wt) instead of higher noble metal content (e.g. 1% wt) normally used in industrial NOx applications. So, the cost of this catalytic system can be substantially reduced.

In spite of the fact that catalysts based on noble metals are less prone to becoming deactivated in the presence of water and/or $SO_2$ [17,18], such catalysts have not been reported to be stable in the presence of water and/or $SO_2$ in the reaction NO/$H_2$/$O_2$ under NOx oxidation conditions. Nevertheless, the new catalyst Pt/s-MgO—$CeO_2$ is very stable in the presence of 5% vol water or 20 ppm $SO_2$ if the actual sulphation method is followed (Example 1, FIG. 8).

Metal oxide catalysts present high selectivity levels to $N_2$ in the reaction NO/$H_2$/$O_2$, very similar to those obtained with the new catalyst Pt/s-MgO—$CeO_2$. Nevertheless, oxide catalysts are much less active when compared with the latter noble metal catalyst. Also, metal oxide catalysts are active only at temperatures higher than 400° C. while the catalyst Pt/s-MgO—$CeO_2$ presents a conversion maximum of NO at 150° C. So, metal oxide catalysts cannot be regarded as candidates for NOx applications under low temperature oxidation conditions.

Zeolites exchanged with metallic ions are very active and selective for the SCR of NO with hydrocarbons at relatively low temperatures. Nevertheless, the catalysts present a very narrow operating temperature range compared to the new catalyst Pt/s-MgO—$CeO_2$. Moreover, the activity of catalysts exchanged with metallic ions falls sharply in the presence of water and/or $SO_2$, while the new catalyst Pt/s-MgO—$CeO_2$ remains stable in the presence of water or $SO_2$.

The new catalyst Pt/s-MgO—$CeO_2$ is the most active, selective and stable reported to date for the reaction NO/$H_2$/$O_2$ under NOx oxidation conditions. Also, this catalyst presents the broadest window of operating temperatures reported for the said reaction (Example 5, Table 1).

$NH_3$—SCR is widely used as anti-contamination technology for the elimination of NO from stationary sources, mainly in conventional thermal power stations [1]. On the other hand, the problems of toxicity and handling of ammonia [1,4] constitute major obstacles against the use of this technology by the general public. In addition, problems related with $NH_3$ corrosion and poisoning of catalysts by $SO_2$ seem difficult to solve. Yet, an SCR technology for $NO_x$ based on hydrogen ($H_2$—SCR) can eliminate most of the problems that have been enumerated.

Hydrogen is widely used in industry [34–46]. In fact, the availability of hydrogen in industry is much greater compared to that of ammonia [46].

The differences discussed above mean that $H_2$—SCR catalytic technology for $NO_x$ of the present invention is new and innovative.

EXAMPLE OF EMBODIMENT OF THE INVENTION

The following examples represent a more detailed description of the invention. There can be no doubt that this detailed description is made by way of illustration only and does not limit the extent of the invention since there are many variations that can be made to it without detracting from the spirit of this invention.

EXAMPLE 1

This example illustrates the synthesis of platinum-based catalysts, supported on a MgO—CeO$_2$ mixed oxide. Presulphated Pt/s-MgO—CeO$_2$ catalysts were prepared by means of the damp impregnation method as follows:

1 g of MgO (Aldrich 34,279-3, 99+%) and 1 g of CeO$_2$ (Aldrich 34,295-5, 99.9%) were impregnated with 50 ml of an aqueous solution containing 7.1 mg (90 µmols) of NH$_4$NO$_3$ (Aldrich, ultra-pure). The water was evaporated with continuous stirring and the residue was dried at 100° C. for 4 h. The residue was then sieved and heated at 300° C. in the presence of air for 2 h in order to fully decompose the ammonium cations. This process was followed in order to ensure the protection (of the sulphation) of the centres for the adsorption of nitrate by the support. The resulting solid was impregnated with 50 ml of an aqueous solution containing 24 mg (90 µmols) of (NH$_4$)$_2$SO$_4$ (Aldrich, ultra-pure). The water was then evaporated with continuous stirring and the residue was dried at 100° C. for 4 h. The residue was sieved and heated in air at 600° C. for 2 h and then cooled to room temperature. 2 g of sulphated support were then impregnated with an aqueous solution containing the desired quantity of hexachloroplatinic acid (Aldrich, 26,258-7). The excess of water was evaporated with continuous stirring and the residue was dried at 80° C. for 24 h. The dry residue was sieved and heated at 600° C. in a flow of air for at least 2 h in order to completely decompose the hexachloroplatinic acid. The catalyst was then reduced in a flow of H$_2$ at 300° C. for at least 2 h. The content of metallic platinum varied in the range 0.1–0.2% by weight.

Two catalysts 0.5% wt Pt/50% MgO—CeO$_2$ were also prepared by the sol-gel procedure following the experimental conditions described by Balakrishnan et al [58]. Weighed quantities of Mg(OEt)$_2$, Ce(NO$_3$)$_3$ and Pt(NH$_3$)$_2$(NO$_2$)$_2$ were dissolved in a solution of EtOH/H$_2$O followed by continuous stirring and heating at 60° C. until a gel forms. The mixed oxide support 50% wt MgO—CeO$_2$ and was also prepared by the ceramic method [63] using pure oxides as starting materials. 0.5% wt of Pt was then deposited on the resulting solid by means of damp impregnation.

The dispersion of platinum in the Pt/MgO—CeO$_2$ catalysts was measured by means of H$_2$ chemisorption at 25° C. following by thermal programmed desorption (TPD) in a He flow. Prior to the TPD of the H$_2$, the sample was purged in He for 45 min at room temperature. A dispersion of platinum of 83% in the 0.1% wt Pt/50% MgO—CeO$_2$ catalyst was determined.

EXAMPLE 2

The integral nitrogen production velocities were determined for the reaction on platinum supported catalysts in the range 100–400° C. as follows:

150 mg of sample of catalyst were placed in a fixed bed quartz micro-reactor. The reactor supply consisted of 0.25% vol NO, 1% vol H$_2$, 5% vol O$_2$ and 93.75% vol He. A flow velocity of 100 ml(STP)/min was used giving a GHSV of approximately 80,000 h$^{-1}$. FIG. 1 shows the effect of the content of MgO (x, % wt) in the mixture 0.5% wt Pt/MgO—CeO$_2$ on the production velocity of N$_2$ per gram of catalyst obtained during the reaction NO/H$_2$/O$_2$ at 150 and 300° C. It can be clearly seen in FIG. 1 that the Pt supported catalyst with a MgO content of 50wt % presents higher N$_2$ production velocities at the two stated temperatures. The dotted lines represent the N$_2$ production velocities predicted by the rule of mixture given by the following equation:

$$R_m = (x/100) \cdot R_{MgO} + (1-(x/100)) \cdot R_{CeO2} \text{ (µmols/g.s)} \quad [1]$$

Equation [1] permits the reaction velocity ($R_m$) to be calculated for the two catalytic phases of Pt/CeO$_2$ and Pt/MgO based on the individual velocities of each catalytic phase and the content x% wt of the phase in the mixture. If there does not exist any cooperation (synergy) between the two phases, then the experimental reaction velocity observed on the mixture of the two solids must also be predicted by Eq [1]. As can be seen in FIG. 1, all the catalysts except 0.5% wt Pt/90% MgO—CeO$_2$ present higher velocities than those predicted by the rule of mixture (Eq [1]) at 150° C. So, a positive synergetic effect is produced. Nevertheless, when the reaction temperature increases to 300° C. a different behaviour is seen in the reaction velocity regarding the content of MgO (FIG. 1). All the catalysts except for Pt/50% MgO—CeO$_2$ present substantially lower experimental velocities than those predicted by the rule of mixture (a negative synergetic effect is observed). The case of the catalyst 0.5% wt Pt/50% MgO—CeO$_2$ can be stated, which presents a positive synergetic effect at both temperatures.

EXAMPLE 3

In this example, the influence of the platinum content on the integral N$_2$ production velocity was investigated in the range 100–400° C. on the system Pt/50% MgO—CeO$_2$.

The supply consisted of 0.25% vol NO, 1% vol H$_2$, 5% vol O$_2$ and 93.75% vol He. 100 mg of each sample was used for these experiments, while the total flow velocity was kept at 100 ml(STP)/min giving a GHSV of approximately 120,000 h$^{-1}$. FIG. 2 presents the integral N$_2$ production velocities per gram of total platinum on the sample as a function of temperature for five platinum contents: 0.1, 0.3, 0.5, 1 and 2% wt As can be seen in FIG. 2, the N$_2$ production velocity falls drastically with the increase in platinum content at any temperature in the range 100–400° C. So, it can be said that the reduction of NO with H$_2$ in the presence of excess O$_2$ on the catalytic system Pt/50% MgO—CeO$_2$ is favoured at low platinum contents.

EXAMPLE 4

This example illustrates the effect of the preparation method on the temperature profile of the N$_2$ integral production velocity for the reaction NO/H$_2$/O$_2$ under NOx oxidation conditions on the catalysts 0.5% wt Pt/50% MgO—CeO$_2$. 100 mg of each catalyst 0.5% wt Pt/50% MgO—CeO$_2$, prepared by damp impregnation, sol-gel and ceramic process methods, were used.

The reaction conditions used in this example are the same as those employed in Example 3. FIG. 3 presents the temperature profile of the N$_2$ integral production velocity per gram of total platinum obtained on the three catalysts mentioned for the reaction NO/H$_2$/O$_2$ in the range 100–400° C. It is evident from FIG. 3 that the catalyst 0.5% wt Pt/50% MgO—CeO$_2$ prepared by the sol-gel method presents substantially higher N$_2$ production velocities in the range 120–200° C. compared to the catalysts prepared by the ceramic and damp impregnation methods. The last two solids show a very similar catalytic behaviour in the range 100–400° C. So, the sol-gel method is preferred for the preparation of the catalyst Pt/50% MgO—$CeO_2$ instead of the ceramic or damp impregnation methods described previously.

Table 1 below compiles the catalytic behaviour of various Pt supported catalysts for the reaction $NO/H_2/O_2$ under NOx oxidation conditions reported in the open literature. The corresponding results obtained with the catalyst 0.1% wt Pt/s-50% MgO—$CeO_2$ for the said reaction are also included in Table 1. In this table, $\Delta T$ is the temperature range wherein $X_{NO}$ is greater than ½ of the maximum observed conversion of NO. The latter parameter could be used for defining the quality of the operation temperature window. For example, a high value of $\Delta T$ corresponds to the best desired operation of the catalyst under practical conditions. Table 1 also compiles the integral $N_2$ production velocity per gram of total Pt ($R_{N2}$) evaluated in accordance with the obtained values of $X_{NO}$ and $S_{N2}$ for each catalyst. Moreover, the mean conversion value of NO ($X_{NO}$) in the range 100–400° C. is also included in Table 1. This parameter was calculated using the following formula:

$$\overline{X}_{NO} = \frac{\int_{100}^{400} X_{NO} \, dT}{400 - 100} = \frac{\int_{100}^{400} X_{NO} \, dT}{300} \quad (2)$$

A similar formula was also used for calculating the mean value of selectivity to $N_2$ which is also given in Table 1.

$$\overline{S}_{N_2} = \frac{\int_{T_1}^{T_2} S_{N_2} \, dT}{T_2 - T_1} \quad (3)$$

In Eq [3], $T_1$ and $T_2$ are the highest and lowest temperatures respectively where catalytic activity can be measured.

In accordance with the results of Table 1, the present catalyst 0.1% wt Pt/s-50% MgO—$CeO_2$ is the best in terms of catalytic behaviour of all the tabulated catalysts. Since the reaction orders with respect to the three reactants must not be greater than 1.5, it is evident from the data of Table 1 that the catalyst 0.1% wt Pt/s-50% MgO—$CeO_2$ presents the highest activity, selectivity and operation temperature window ($\Delta T$) ever reported for the reaction $NO/H_2/O_2$. Nevertheless, the comparison between the catalysts Pt/s-MgO—$CeO_2$, Pt/La—Ce—Mn—O Pt/$Al_2O_3$ and Pt/$SiO_2$ is direct when the same experimental conditions are used. The mean conversion value of NO increases by approximately 50% when the Pt is supported on s-50% MgO—$CeO_2$ with respect to the support $La_{0.5}Ce_{0.5}MnO_3$, while the increase becomes larger (230%) if the comparison is made with the support $SiO_2$. Also, the mean value of selectivity to $N_2$ of 86.5% obtained with the catalyst Pt/s-50% MgO—$CeO_2$ is the same as that obtained with the catalyst Pt/$La_{0.5}Ce_{0.5}MnO_3$ but is much greater than that obtained with the other catalysts reported in Table 1. The fact must also be added that the operation temperature window with the catalyst Pt/s-50% MgO—$CeO_2$ ($\Delta T=190°$ C.) is, as far as we know, the highest value ever reported for the reaction $NO/H_2/O_2$ with 5% $H_2O$ in the supply stream.

EXAMPLE 5

This example compares the activity (in terms of NO conversion, $X_{NO}$) of the catalysts 0.1% wt Pt/s-50% MgO—$CeO_2$ (●), 0.1% wt Pt/$La_{0.5}Ce_{0.5}MnO_3$ (▲) and 0.1% wt Pt/$SiO_2$ (■) for the reaction $NO/H_2/O_2$ under NOx oxidation conditions with 5% vol $H_2O$ in the supply and in the range 100–400° C. The results indicate that the catalyst 0.1% wt Pt/$La_{0.5}Ce_{0.5}MnO_3$ has a higher activity than any other reported to date for the reaction $NO/H_2/O_2$ [54]. 150 mg of each catalyst were used and the supply consisted of 0.25% vol NO, 1% vol $H_2$, 5% vol $O_2$, 5% vol $H_2O$ and 88.75% vol He. A flow velocity of 100 ml(STP)/min was used giving a GHSV of approximately 80,000 $h^{-1}$. As shown in FIG. 4, all the catalysts present maximum conversion values of NO ($X_{NO,max}$) in the range 120–150° C. Nevertheless, the catalyst 0.1% wt Pt/s-50% MgO—$CeO_2$ shows significantly higher conversion values than the catalysts 0.1% wt Pt/$La_{0.5}Ce_{0.5}MnO_3$ and 0.1% wt Pt/$SiO_2$ at all temperatures in the range 100–400° C. As is clearly shown in FIG. 4 and in Table 1, the catalyst 0.1% wt Pt/s-50% MgO—$CeO_2$ presents values of $\Delta T$ two and three times higher than those observed with the catalysts 0.1% wt Pt/$La_{0.5}Ce_{0.5}MnO_3$ and 0.1% wt Pt/$SiO_2$ respectively (see Table 1). It can be seen that the catalyst Pt/$SiO_2$ exhibits virtually zero activity at temperatures higher than 250° C. The value of $\Delta T$ obtained with the catalyst 0.1% wt Pt/s-50% MgO—$CeO_2$ is the highest of all those reported in the literature (Table 1).

TABLE 1

Catalytic activity of various Pt supported catalysts for the reaction $NO/H_2/O_2$ in the temperature range 100–400° C.

| Catalyst | Reaction conditions | | | $\Delta T$ | $R_{N2}^{b}$ | $T_{max}^{c}$ | $X_{NO,max}$ | $S_{N2}$ (%) | $S_{N2}$ | $X_{NO}$ (%)[e] | Ref. |
| | NO (%) | $H_2$ (%) | $O_2$ (%) | (° C.)[a] | (μmol/s.$g_m$) | (° C.) | (%) | (at $X_{NO,max}$) | (%)[d] | | |
|---|---|---|---|---|---|---|---|---|---|---|---|
| 1% Pt—Mo—Co—/$Al_2O_3$ | 0.3 | 0.8 | 8.0 | 30 | 12.1 | 150 | 55 | 50 | 48.3 | 8.5 | [47] |
| 1% Pt/$Al_2O_3$ | 0.05 | 0.2 | 6 | 40 | 10.1 | 140 | 50 | 60 | 12.9 | 10.0 | [48] |
| 1% Pt/$TiO_2$ | 0.1 | 0.3 | 5.0[f] | 50 | 2.2 | 100 | 50 | 21 | 19.3 | 9.0 | [49] |
| 0.1% Pt/$Al_2O_3$ | 0.25 | 1.0 | 5.0[g] | 45 | 285.8 | 125 | 66 | 60 | 54.8 | 12.3 | [54] |
| 0.1% Pt/$SiO_2$ | 0.25 | 1.0 | 5.0[g] | 55 | 240.1 | 120 | 80 | 65 | 60.7 | 19.2 | [59] |
| 0.1% Pt/$La_{0.5}Ce_{0.5}MnO_3$ | 0.25 | 1.0 | 5.0[g] | 65 | 396.9 | 150 | 87 | 87 | 86.4 | 42.8 | [54] |

TABLE 1-continued

Catalytic activity of various Pt supported catalysts for
the reaction $NO/H_2/O_2$ in the temperature range 100–400° C.

| Catalyst | Reaction conditions | | | $\Delta T$ (° C.)[a] | $R_{N_2}$[b] ($\mu$mol/s.g$_m$) | Tmax[c] (° C.) | $X_{NO,max}$ (%) | $S_{N_2}$ (%) (at $X_{NO,max}$) | $S_{N_2}$ (%)[d] | $X_{NO}$ (%)[e] | Ref. |
|---|---|---|---|---|---|---|---|---|---|---|---|
| | NO (%) | H$_2$ (%) | O$_2$ (%) | | | | | | | | |
| 0.1% Pt/ s-50%/MgO—CeO$_2$ | 0.25 | 1.0 | 5.0[g] | 190 | 418.2 | 150 | 99 | 84 | 86.5 | 66.5 | |

[a] $\Delta T$: Temperature range where $X_{NO} > X_{NOmax}/2$,
[b] maximum velocity of formation of $N_2$ (per gram of Pt),
[c] Temperature at which the maximum conversion of NO is measured.

[d] $S_{NS}$: mean value of selectivity to $N_2$:

$$\bar{S}_{N_2} = \frac{\int_{T_1}^{T_2} S_{N_2} dT}{T_2 - T_1},$$

$T_1$ and $T_2$ are the lowest and highest temperatures, respectively, where the activity is measurable;
[e] $X_{NO}$: mean conversion value of NO in the range 100–400° C.:

$$\overline{X_{NO}} = \frac{\int_{100}^{400} X_{NO} dT}{400-100} = \frac{\int_{100}^{400} X_{NO} dT}{300}$$

[f] 10% $H_2O$ is present in the supply,
[g] 5% $H_2O$ is present in the suppl

EXAMPLE 6

This example compares the selectivity to $N_2$ ($S_{N2}$) of the reaction $NO/H_2/O_2$ under NOx oxidation conditions as a function of temperature and in the range 100–400° C. obtained with the catalysts 0.1% wt Pt/s-50% MgO—CeO$_2$ (●), 0.1% wt Pt/La$_{0.5}$Ce$_{0.5}$MnO$_3$ (▲) and 0.1% wt Pt/SiO$_2$ (■). The experimental reaction conditions used in this example are the same as those used in example 5.

As shown in FIG. 5, the catalysts Pt/s-50% MgO—CeO$_2$ and Pt/La$_{0.5}$Ce$_{0.5}$MnO$_3$ present high values of selectivity to $N_2$ in the range 100–400° C. In particular, in the range 100–200° C. the catalyst Pt/s-50% MgO—CeO$_2$ shows values of selectivity to $N_2$ of between 82 and 85%, while the catalyst Pt/La$_{0.5}$Ce$_{0.5}$MnO$_3$ presents values of $S_{N2}$ in the range 82–90%. In the range 250–400° C., the selectivity to $N_2$ is approximately constant at levels of 96 and 93% with the catalysts Pt/s-50% MgO—CeO$_2$ and Pt/La$_{0.5}$Ce$_{0.5}$MnO$_3$, respectively. As reported in Table 1, the catalyst Pt/s-50% MgO—CeO$_2$ presents a mean selectivity value to $N_2$ of 86.5%, which is practically the same as that obtained with the catalyst Pt/La$_{0.5}$Ce$_{0.5}$MnO$_3$ (86.4%). Much lower selectivity values (50–65%) are obtained in the case of the catalyst Pt/SiO$_2$ which presents a mean value of $S_{N2}$ of 60.7% (Table 1). The mean value $S_{N2}$ obtained with the catalyst 0.1% wt Pt/s-50% MgO—CeO$_2$ is the highest of all those reported in the literature to date (Table 1).

EXAMPLE 7

In this example, the stability of the catalyst 0.1% wt Pt/s-50% MgO—CeO$_2$ is studied for the reaction $NO/H_2/O_2/H_2O$ under NOx oxidation conditions at 150° C.

The reaction conditions used in this example are the same as those in example 5. FIG. 6 presents the variation in integral production velocity of nitrogen per gram of catalyst as a function of time for the catalysts 0.1% wt Pt/s-50% MgO—CeO$_2$, 0.1% wt Pt/La$_{0.5}$Ce$_{0.5}$MnO$_3$ and 0.1% wt Pt/SiO$_2$ in the stream. As shown in FIG. 6, the integral production velocity of $N_2$ obtained with the catalysts Pt/La$_{0.5}$Ce$_{0.5}$MnO$_3$ and Pt/SiO$_2$ rapidly decreases during the first 2 hours in current. After the first 2 hours in reaction, the $N_2$ production velocity on these two catalysts continues to fall though at a slower rate. On the other hand, the catalyst Pt/s-50% MgO—CeO$_2$ presents a practically constant $N_2$ production velocity, even after 24 h in reaction. This is a result of great importance since it is known that many NOx catalysts that have been tested undergo a deactivation with current time when water is present in the supply current [3].

EXAMPLE 8

In this example, the stability of the catalyst 0.1% wt Pt/50% MgO—CeO$_2$ for the reaction $NO/H_2/O_2$ in NOx oxidation conditions in the presence of $SO_2$ in the supply is studied. The sulphur dioxide is one of the known poisons of many NOx catalysts [17].

The reaction $NO/H_2/O_2/SO_2$ is studied at 200° C. using 150 mg of the catalyst 0.1% wt Pt/50% MgO—CeO$_2$ and a composition of the supply of 0.25% vol NO, 1% vol $H_2$, 5% vol $O_2$, 23 ppm $SO_2$ and 93.75% vol He. A flow velocity of 100 ml(STP)/min was used, which is equivalent to a GHSV of approximately 80,000 h$^{-1}$. FIG. 7 presents the NO conversion profiles with the time in the stream at 200° C. on the catalyst 0.1% wt Pt/50% MgO—CeO$_2$ when the sulphated and non-sulphated 50% MgO—CeO$_2$ support is used (see example 1). As can be seen, the catalyst Pt/MgO—CeO$_2$ with the non-sulphated support is rapidly deactivated with the time in the stream and becomes completely deactivated after 20 h in reaction. Nevertheless, the catalyst Pt/MgO—CeO$_2$ with the support previously sulphated has a completely different behaviour (Example 1, FIG. 7). This catalyst presents just a slight drop in NO conversion during the first 4 hours in current, at the same time showing a practically constant NO conversion after the first 4 hours for a total time in stream of 24 h. This is a result of excellent stability and of industrial importance since no stable catalysts in the reaction $NO/H_2/O_2$ in the presence of low concentrations of $SO_2$ have been reported. It is stated here that the concentration of $SO_2$ in many industrial currents lies in the range 5–20 ppm. So, the catalyst 0.1% wt Pt/50% MgO—$CeO_2$ with the pre-sulphated support can find practical applications even in cases of maximum $SO_2$ concentrations present in combustion streams.

EXAMPLE 9

This example shows the effect of the partial pressure of hydrogen on the temperature profile of the integral production velocity of $N_2$ in the reaction $NO/H_2/O_2$ under NOx oxidation conditions on the catalyst 0.1% wt Pt/50% MgO—$CeO_2$. The experimental reaction conditions used in this example are the same as in example 3. FIG. 8 presents the temperature profiles of the $N_2$ production velocity obtained with the catalyst 0.1% wt Pt/50% MgO—$CeO_2$ (non-sulphated support) for the reaction $NO/H_2/O_2$ and using hydrogen concentrations of 1 and 3% vol. As shown in FIG. 8, the integral production velocity of $N_2$ substantially improves for all reaction temperatures when the $H_2$ concentration increases from 1 to 3% vol. In particular, an increase of two and four times is obtained at 150 and 200° C. respectively, when the hydrogen concentration in the supply increases from 1 to 3% vol. This is a result of great importance since with the increase in hydrogen concentration the quantity of catalyst can be regulated towards a minimum cost and desirable $N_2$ production yields.

EXAMPLE 10

This final example describes the effect of the contact time (in terms of the W/F ratio) on the NO conversion with the catalyst 0.1% wt Pt/50% MgO—$CeO_2$. The supply consisted of 0.25% vol NO, 1.0% vol $H_2$, 5.0% vol $O_2$ and 93.75% vol He. The variation in W/F was achieved by adjusting the quantity of catalyst (75–150 mg) and flow velocity (50–200 ml/min).

FIG. 9 shows the effect of the contact time on the NO conversion with the catalyst 0.1% wt Pt/MgO—$CeO_2$ at 150° C. The NO conversion rapidly increases with the increase in contact time from 0.02 to 0.09 g.s/ml. It is stated that the contact times of the $NH_3$—SCR reactors of NO on commercial catalysts have typical values in the range 0.04–0.6 g.s/ml [1,55–57]. The low contact time required for obtaining high conversions of NO on the catalyst Pt/MgO—$CeO_2$ indicates that the activity of this catalyst is sufficiently high for industrial application.

CITED BIBLIOGRAPHY

Figure 1:
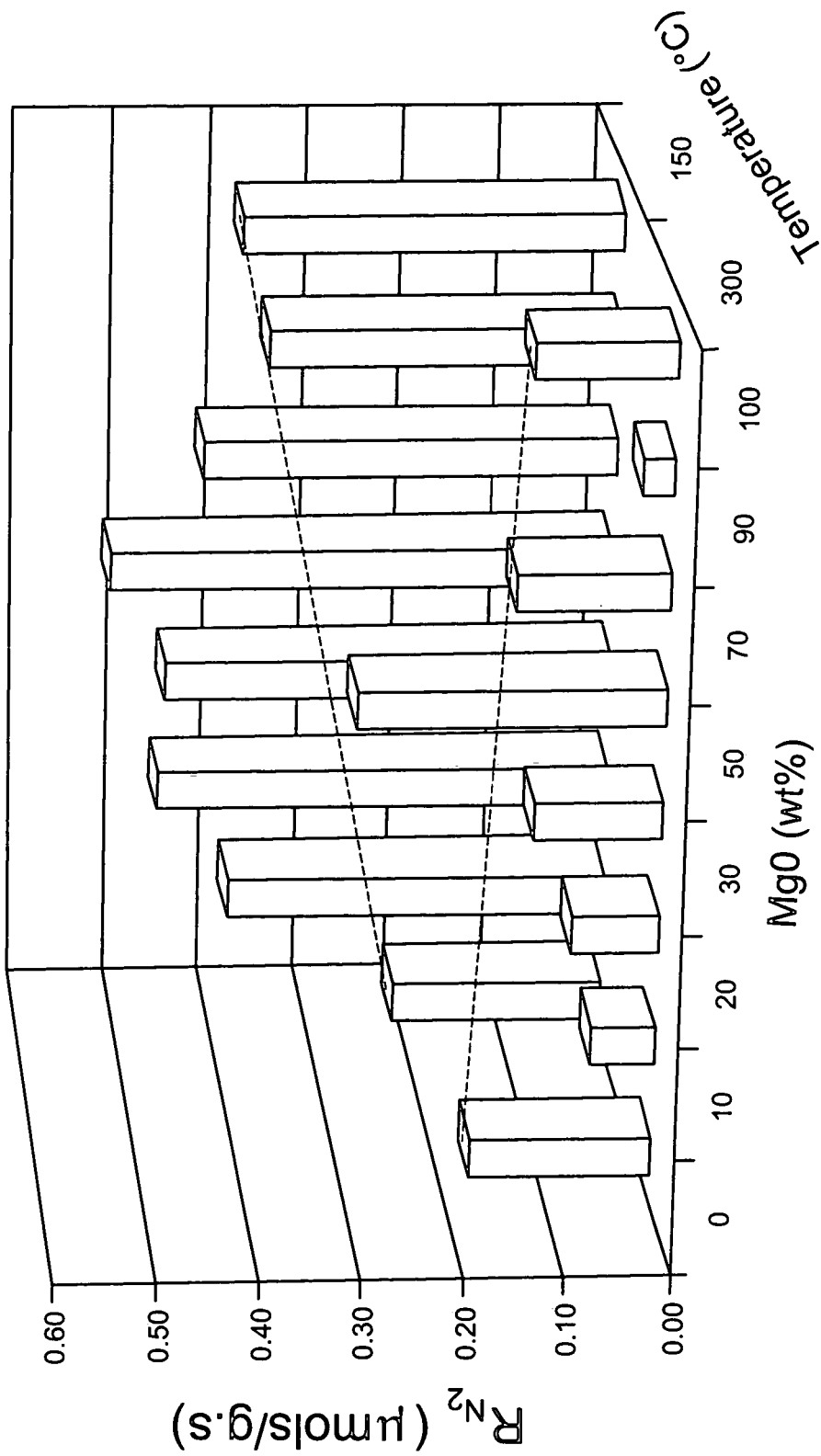
FIG. 1 presents the integral production velocities of $N_2$ per gram of catalyst as a function of the MgO content (x, % wt) in catalysts 0.5% wt Pt/xMgO—$CeO_2$, obtained during the reaction $NO/H_2/O_2$ at 150° C. and 300° C. Reaction conditions $H_2$=1.0%, NO=0.25%, $O_2$=5%, W=0.1 g, GHSV=80,000 $h^{-1}$, $P_{tot}$=1.0 bar.
Figure 2:
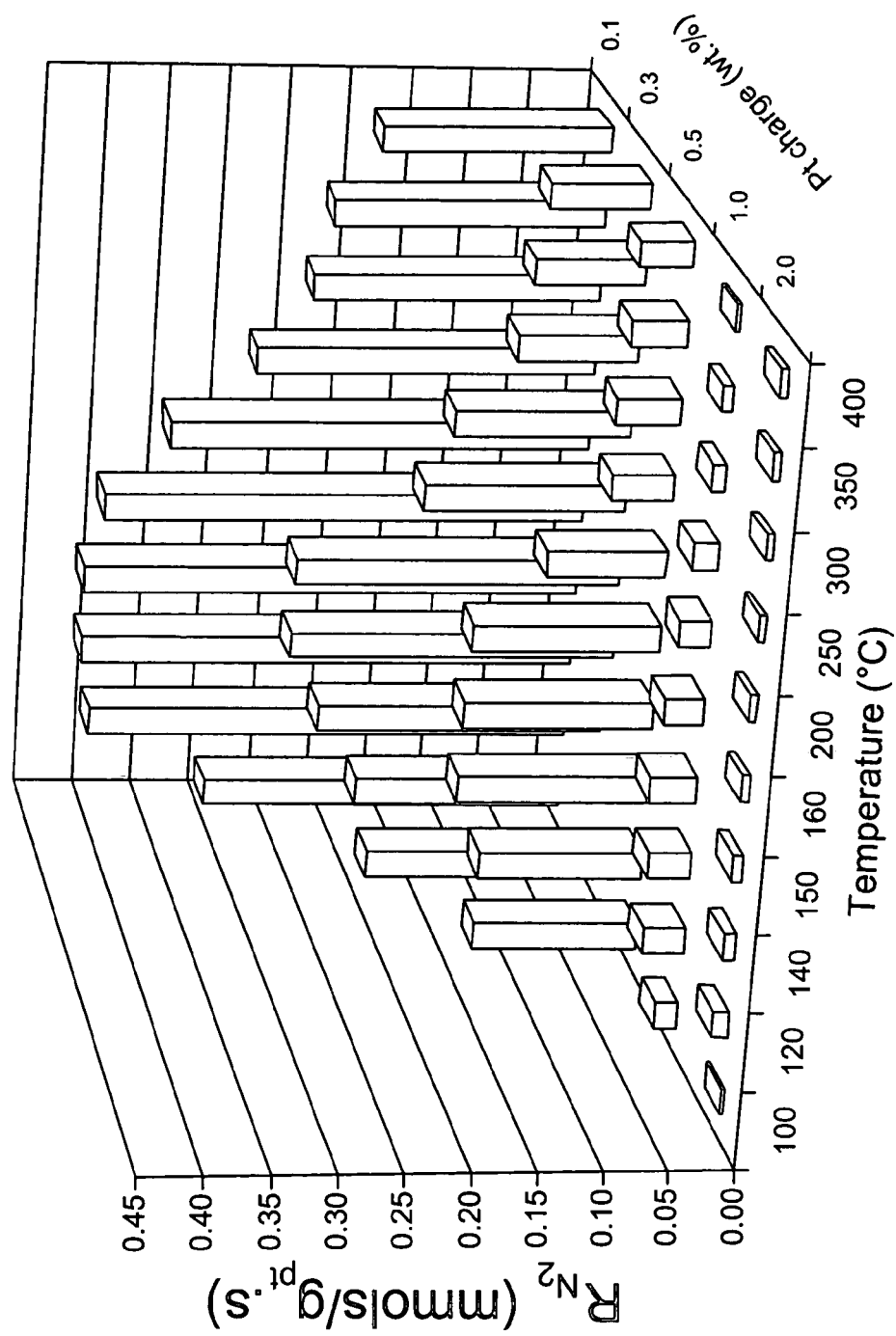
FIG. 2 shows the influence of the content of Pt metal (% wt) on the integral production velocities of $N_2$ during the reaction $NO/H_2/O_2$ under NOx oxidation conditions on the catalysts x % wt Pt/50% MgO—$CeO_2$ in the range 100–400° C. Reaction conditions $H_2$=1.0%, NO=0.25%, $O_2$=5%, W=0.1 g, GHSV=80,000 $h^{-1}$, $P_{tot}$=1.0 bar.
Figure 3:
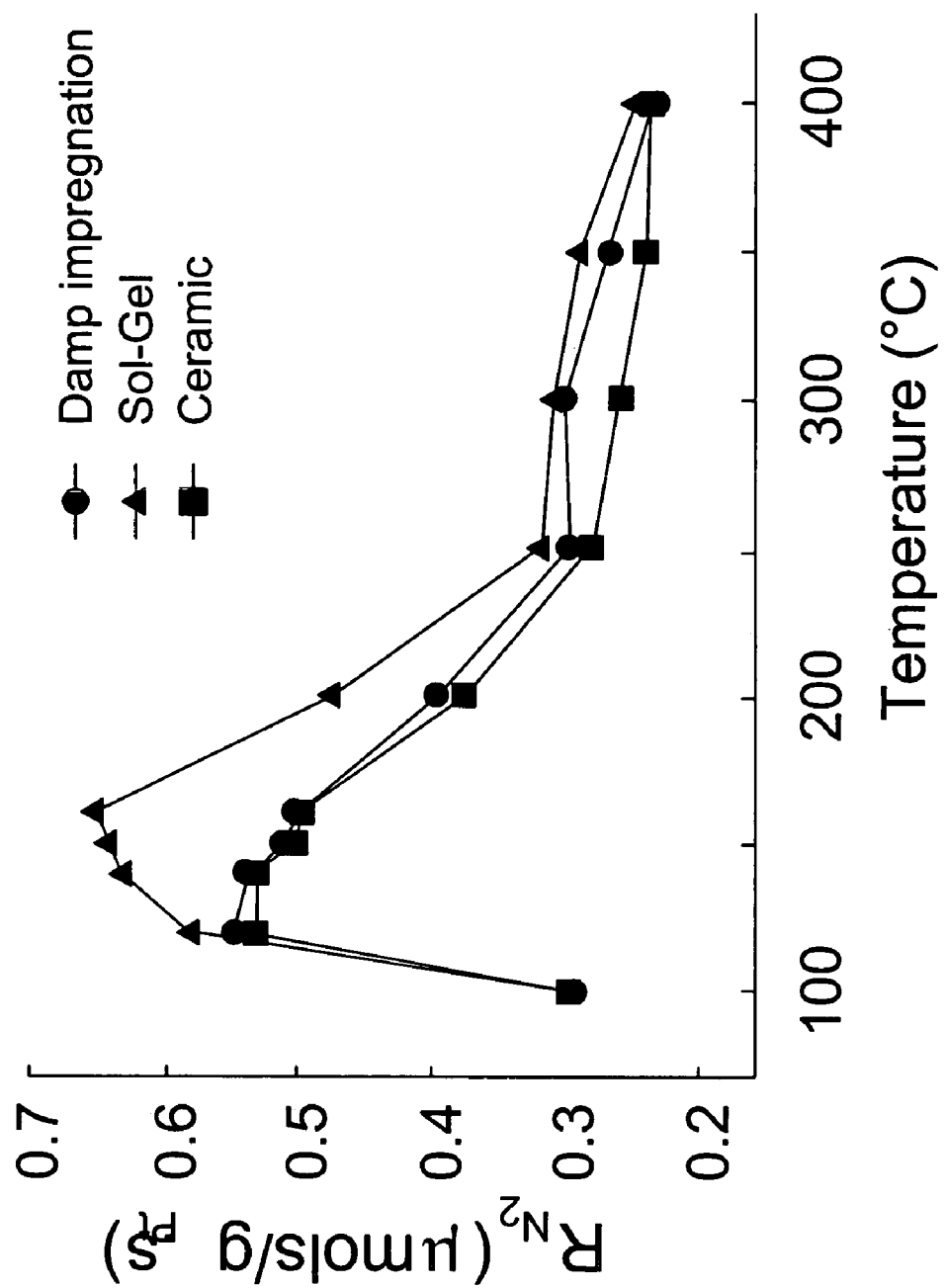
FIG. 3 shows the effect of the preparation method on the temperature profile of the integral production velocities of $N_2$ for the reaction $NO/H_2/O_2$ under NOx oxidation conditions on the catalyst 0.5% wt Pt/50% MgO—$CeO_2$. Reaction conditions $H_2$=1.0%, NO=0.25%, $O_2$=5%, W=0.1 g, GHSV=80,000 $h^{-1}$, $P_{tot}$=1.0 bar.
Figure 4:
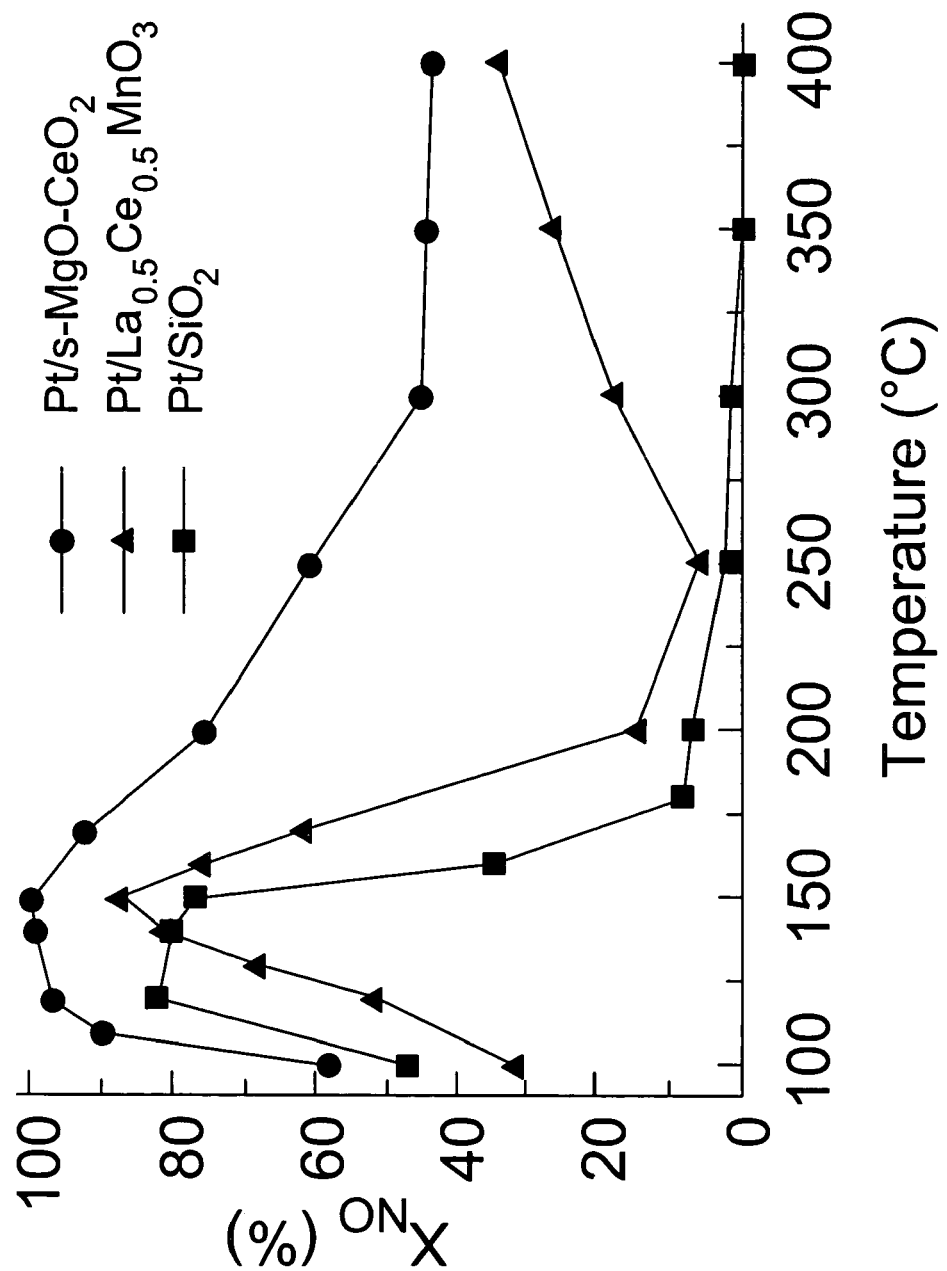
FIG. 4 compares the NO conversion temperature profiles ($X_{NO}$) of the reaction $NO/H_2/O_2$ under NOx oxidation conditions on the catalyst 0.1% wt Pt/s-50% MgO—$CeO_2$ (●), 0.1% wt $Pt/La_{0.5}Ce_{0.5}MnO_3$ (▲) and 0.1% wt $Pt/SiO_2$ (■). Reaction conditions $H_2$=1.0%, NO=0.25%, $O_2$=5%, $H_2O$=5%, W=0.15 g, GHSV=80,000 $h^{-1}$, $P_{tot}$=1.0 bar.
Figure 5:
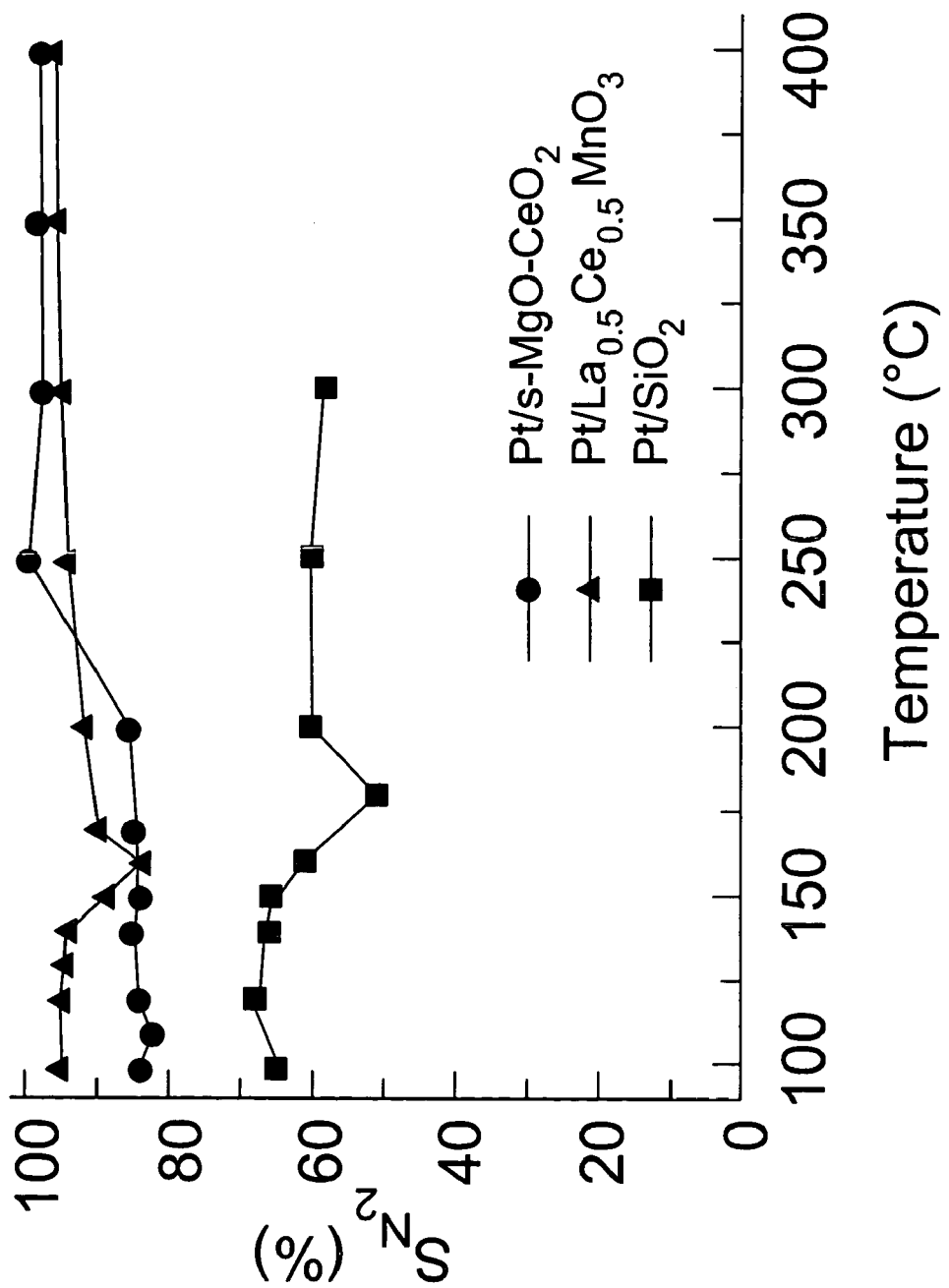
FIG. 5 compares the temperature profiles of nitrogen selectivity ($S_{N2}$) of the reaction $NO/H_2/O_2$ under NOx oxidation conditions on the catalysts 0.1% wt Pt/s-50% MgO—$CeO_2$ (●), 0.1% wt $Pt/La_{0.5}Ce_{0.5}MnO_3$ (▲) and 0.1% wt $Pt/SiO_2$ (■). Reaction conditions $H_2$=1.0%, NO=0.25%, $O_2$=5%, $H_2O$=5%, W=0.15 g, GHSV=80,000 $h^{-1}$, $P_{tot}$=1.0 bar.
Figure 6:
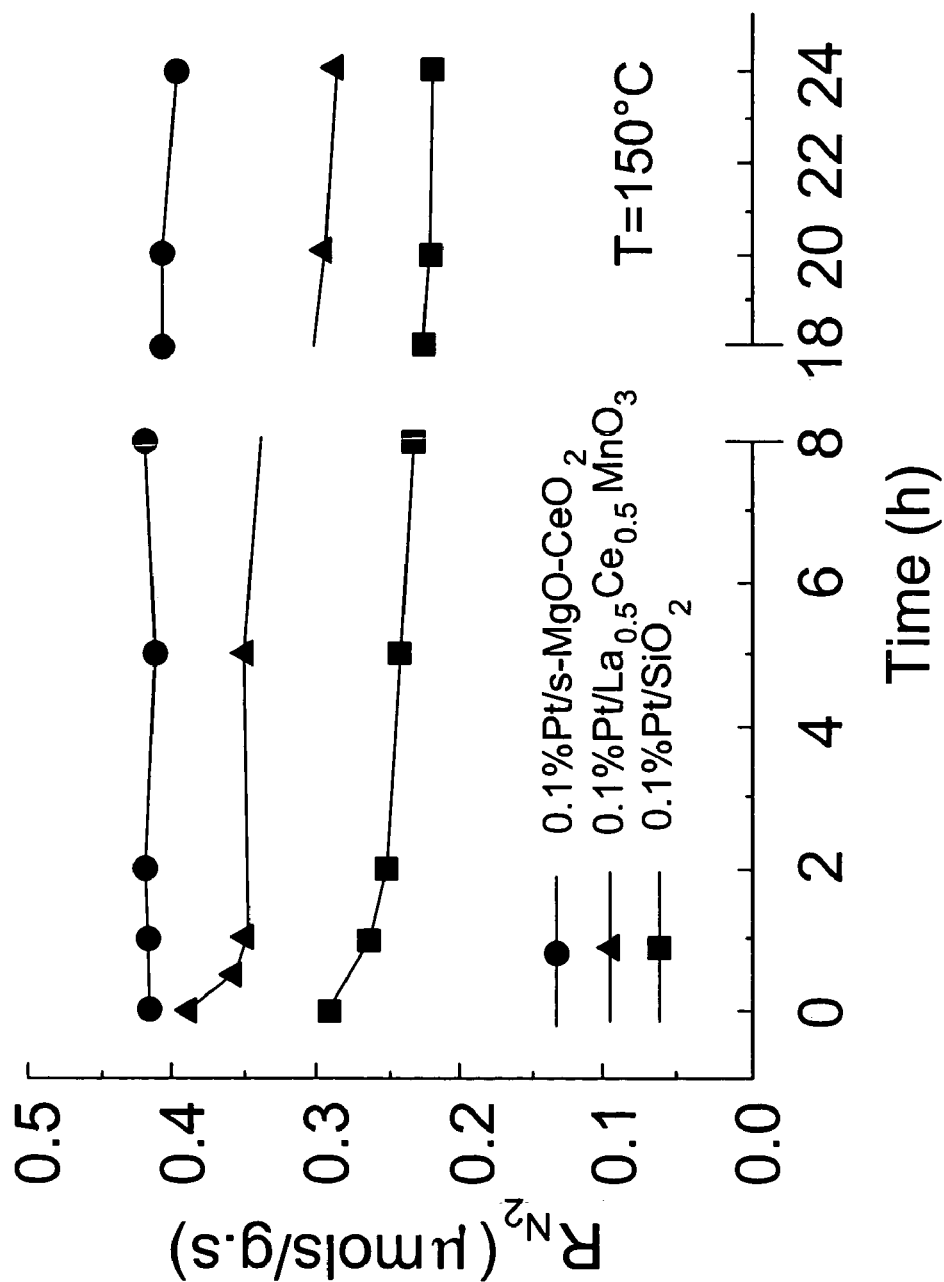
FIG. 6 compares the stability (in terms of integral reaction velocities of $N_2$) with current time in the catalysts 0.1% wt Pt/s-50% MgO—$CeO_2$ (●), 0.1% wt $Pt/La_{0.5}Ce_{0.5}MnO_3$ (▲) and 0.1% wt $Pt/SiO_2$ (●). Reaction conditions $H_2$=1.0%, NO=0.25%, $O_2$=5%, $H_2O$=5%, W=0.15 g, GHSV=80,000 $h^{-1}$, $P_{tot}$=1.0 bar.
Figure 7:
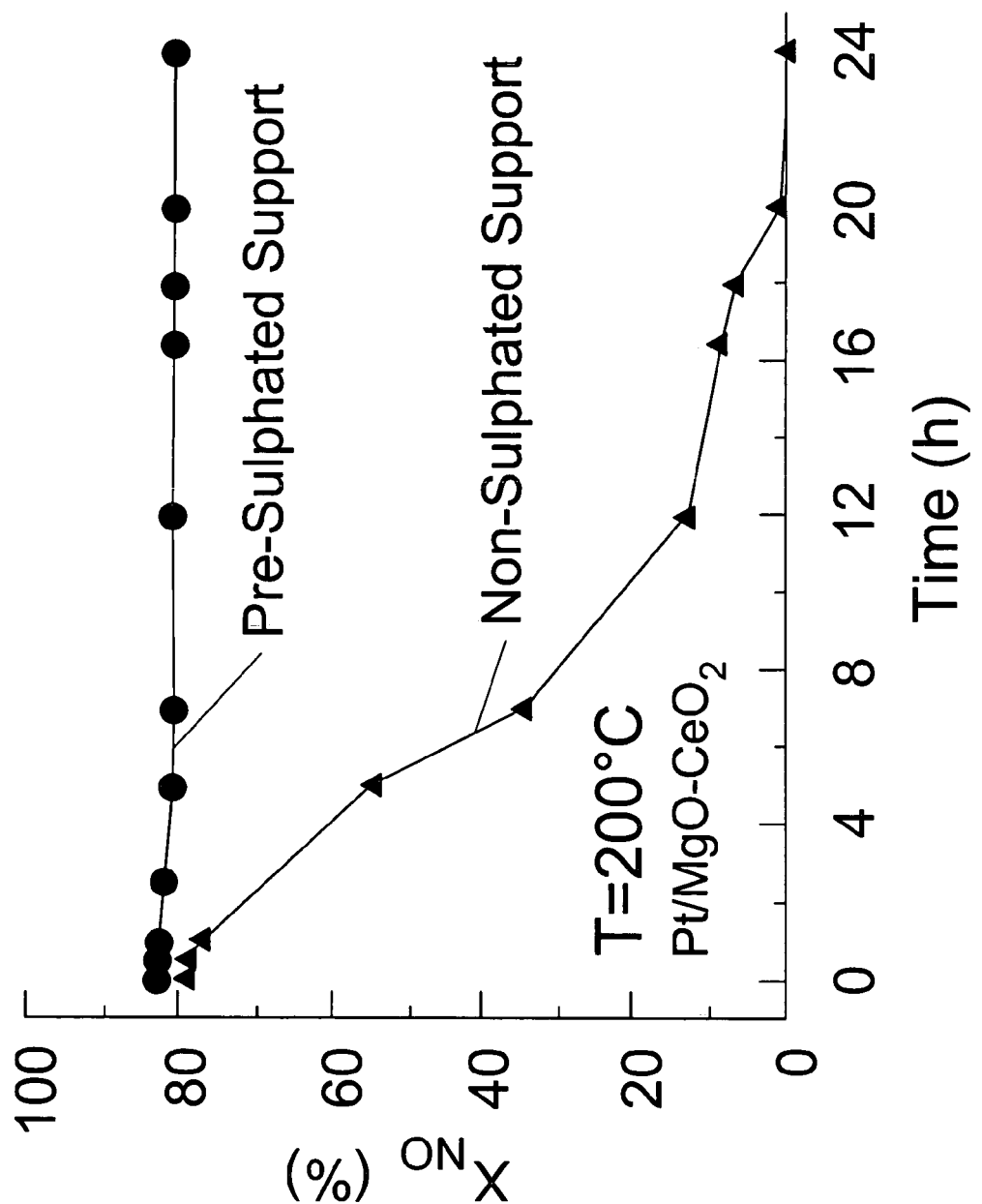
FIG. 7 compares the influence of the presence of $SO_2$ in the reaction current on NO conversion ($X_{NO}$) during the reaction $NO/H_2/O_2$ under NOx oxidation conditions on the catalyst 0.1% wt Pt/50% MgO—$CeO_2$ pre-sulphated (●) and non-sulphated (▲). Reaction conditions $H_2$=1.0% O, NO=0.25%, $O_2$=5%, $SO_2$=23 ppm, T=200° C., W=0.15 g, GHSV=80,000 $h^{-1}$, $P_{tot}$=1.0 bar.
Figure 8:
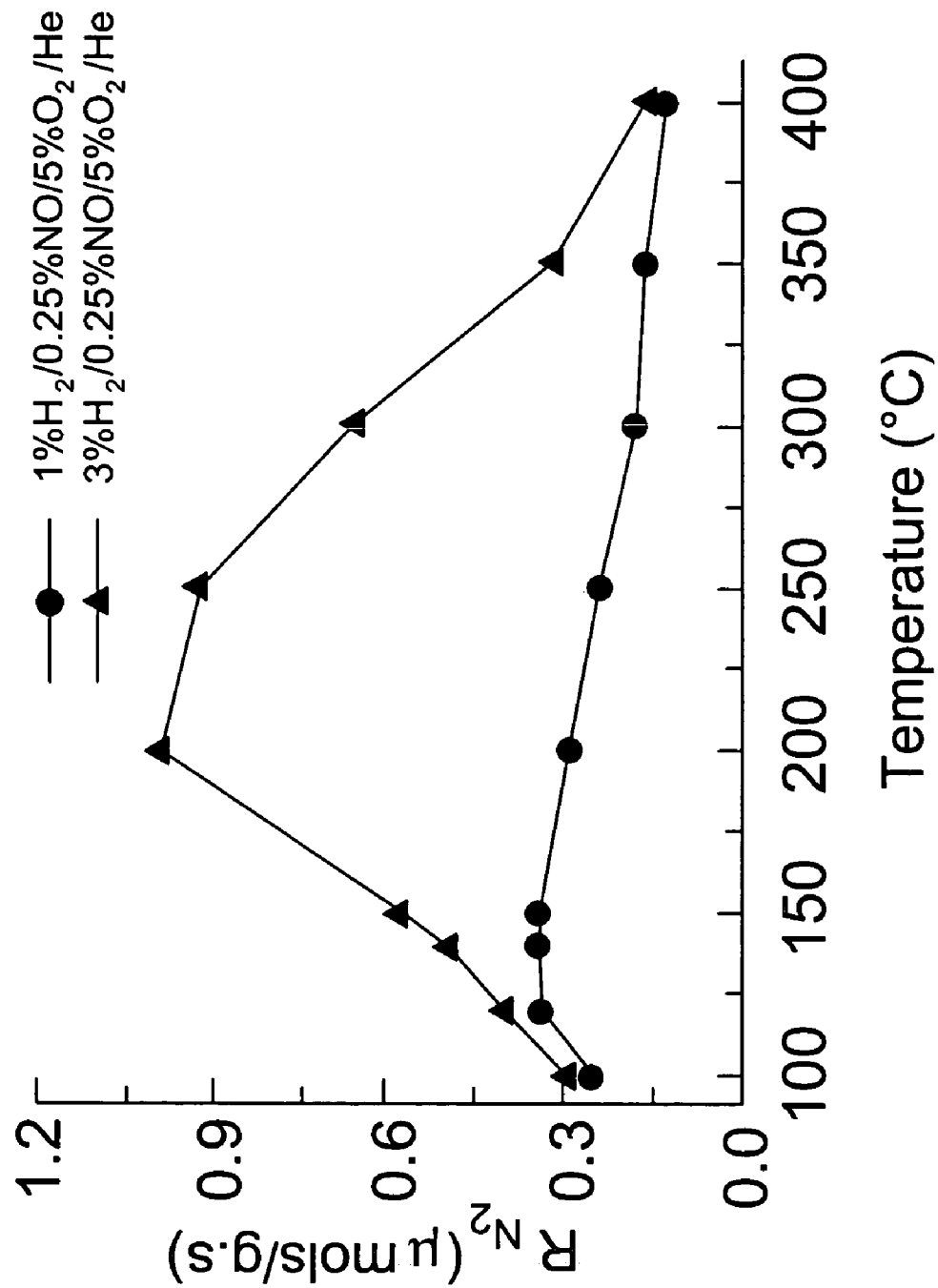
FIG. 8 presents the effect of the partial pressure of hydrogen on the integral production velocity of $N_2$ compared to the temperature for the reaction $NO/H_2/O_2$ under NOx oxidation conditions at a total pressure of 1 bar on the catalyst 0.1% wt Pt/50% MgO—$CeO_2$. Reaction conditions $H_2$=1.0%, NO=0.25%, $O_2$=5%, W=0.15 g, GHSV=80,000 $h^{-1}$ (●), and $H_2$=3.0%, NO=0.25%, $O_2$=5%, W=0.075 g, GHSV=320,000 $h^{-1}$ (▲).
Figure 9:
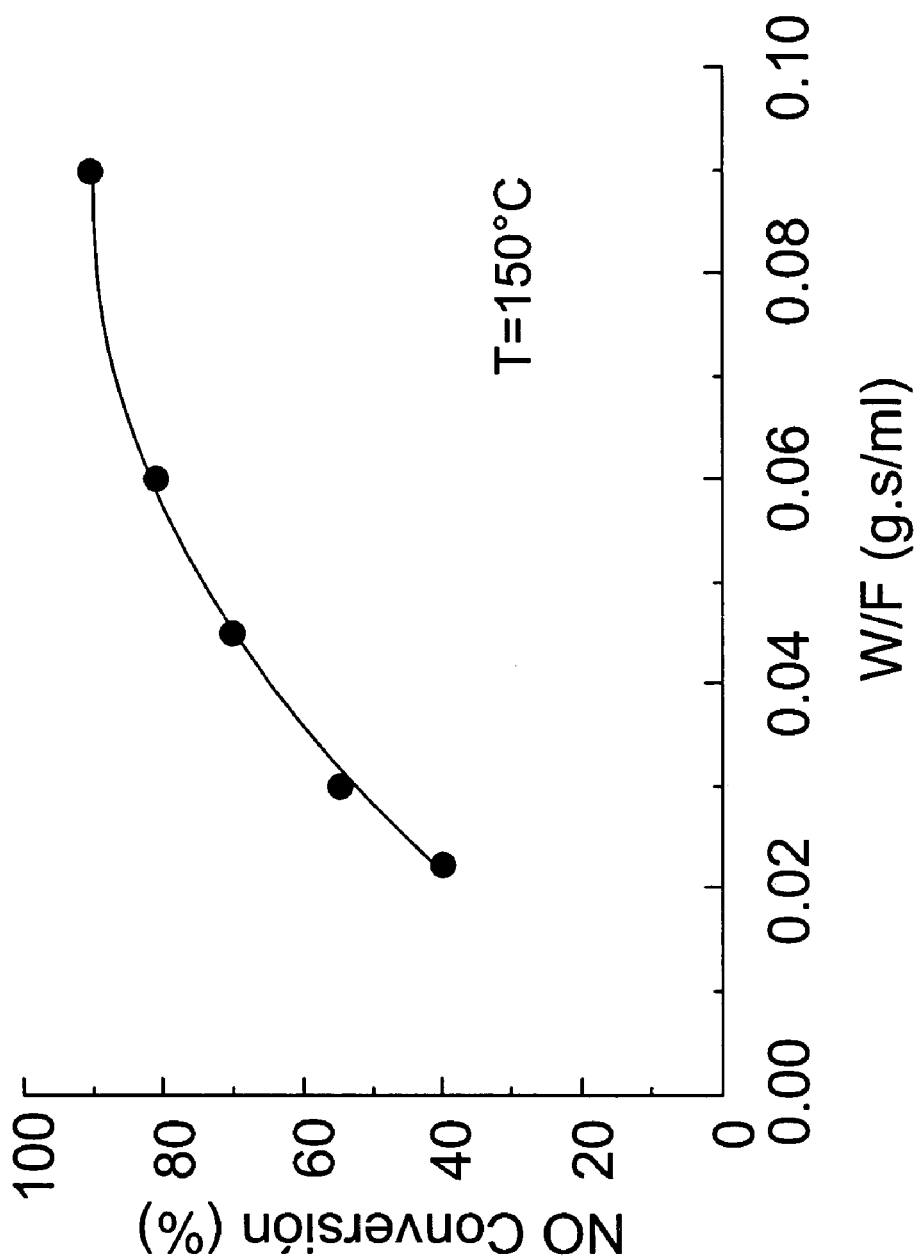
FIG. 9 shows the influence of contact time (in terms of W/F) on NO conversion in the reaction $NO/H_2/O_2$ under NOx oxidation conditions on the catalyst 0.1% wt Pt/50% MgO—$CeO_2$. Reaction conditions $H_2$=1%, NO=0.25%, $O_2$=5%, T=150° C., $P_{tot}$=1.0 bar.

1. G. Busca, L. Lietti, G. Ramis and F. Berti, Appl. Catal. B 18 (1998) 1.
2. C. J. Pereria and K. W. Phumlee, Catal. Today 13 (1992) 23.
3. A. Fritz and V. Pitchon, Appl. Catal. B 13 (1997) 1.
4. V. M. Zamansky, P. M. Maly, M. Sheldon, W. R. Seeker, B. A. Folsom, "Second Generation Advanced Reburning for high efficiency Nox control", Energy and Environmental Research Corporation, report under Ocntract No. DE-AC22-95PC95251.
5. R. I. Pusateri, J. R. Katzer and W. H. Monaque, AICHE J. 20 (1974) 219.
6. T. Tabata, M. Kokitsu and O. Okada, Catal. Today 22 (1994) 147.
7. V. I. Parvulescu, P. Grange and B. Delmon, Catal. Today 46 (1998) 233.
8. A. Obuchi, A. Ohi, M. Nakamura, A. Ogata, K. Mizuno and H. Ohuchi, Appl. Catal. B 2 (1993) 71.
9. R. Burch, P. J. Millington and A. P. Walker, Appl. Catal. B 4 (1995) 65.

10. D. K. Captain, K. L. Roberts and M. D. Amiridis, Catal. Today 42 (1998) 65.
11. R. Burch, J. A.Sullivan and T. C. Watling, Catal. Today 42 (1998) 13.
12. R. Burch and A. Ramli, Appl. Catal. B 15 (1998) 63.
13. M. D. Amiridis, K. L. Roberts and C. J. Perreria, Appl. Catal. B 14 (1997) 203.
14. G. R. Bamwenda, A. Ogata, A. Obuchi, J. Oi, K. Mizuno and J. Skrzypek, Appl. Catal. B 6 (1995) 311.
15. E. A. Efthimiades, S. C. Christoforou, A. A. Nikolopoulos and I. A. Vasalos, Appl. Catal. B: Envir. 22 (1999) 91.
16. E. Seker, J. Cavatio, E. Gulari, P. Lorpongpaiboon and S. Osuwan, Appl. Catal. A 183 (1999) 121.
17. H. Hirabayashi, H. Yahiro, N. Mizuno and M. Iwamoto, Chem. Lett. (1992) 2235.
18. G. Zhang, T. Yamaguchi, H. Kawakami and T. Suzuki, Appl. Catal. B: Envir. 1 (1992) L1519.
19. A. Obuchi, A. Ohi, M. Nakamura, A, Ogata, K. Mizuno and H. Ohuchi, Appl. Catal. B: Envir. 2 (1993) 71.
21. F. J. Janssen, in G. Erti, H. Knözinger and J. Weitkamp (Eds.), Handbook of Heterogeneous Catalysis, VCH, Weinheim, (1997) p. 1633.
22. B. Rausenberger, W. Swiech, A. K. Schmid, C. S. Rastomjee, W. Emgel and A. M. Bradshaw, J. Chem. Soc., Faraday Trans. 94(7) (1998) 963.
23. R. Dumpelmannm, N. W. Cant and D. L. Trimm in A. Frennet and J.-M. Bastin (Eds.) $3^{rd}$ ICC and Automotive Pollution Control, Brussels, 2 (1994) 13.
24. K. Tomishige, K. Asakura and U. Iwasawa, J. Catal. 157 (1995) 472.
25. W. C. Hecker and A. T. Bell, J. Catal. 92 (1985) 247.
26. A. Hornung, M. Muhler and G. Ertl, Catal. Lett. 53 (1998) 77.
27. T. P. Kobylinski and B. W. Taylor, J. Catal. 33 (1974) 376.
28. S. J. Huang, A. B. Walters and M. A. Vannice, J. Catal. 173 (1998) 229.
29. R. Burch and S. Squire, Catal. Lett. 27 (1994) 177.
30. T. M. Salama, R. Ohnishi, T. Shido and M. Ichikawa, J. Catal. 162 (1996) 169.
31. T. Tanaka, K. Yokota, H. Doi and M. Sugiura, Chem. Lett. (1997) 273.
32. A. Lindsteld, D. Strömberg and M. A. Milh, Appl. Catal, 116 (1994) 109.
33. D. Ferri, L. Forni, M. A. P. Dekkers and B. E. Nieuwenhuys, Appl. Catal. B: Envir. 16 (1998) 339.
34. J. R. Rostrup-Nielsen, Catal. Today 18 (1993) 305.
35. I. Alstrup, J. Catal. 109 (1998) 241.
36. S. T. Ceyer, Q. Y. Yang, M. B. Lee, J. D. Beckerle and A. D. Johnson, Stud. Surf. Sci. Catal. 36 (1987) 51.
37. I. Alstrup and M. T. Travers, J. Catal. 135 (1992) 147.
38. T. B. Beebe, Jr., D. W. Goddman, B. D. Kay and T. J. Yates, Jr., J. Chem. Phys. 87 (1987) 2305.
39. I. Alstrup, I. Chorkendorff and S. Ullmann, Surf. Sci. 234 (1990) 79.
40. H. J. Topfer, Gas Wasserfach 117 (1976) 412.
41. S. Tenner, Hydrocarbon Processing 66(7) (1987) 42.
42. A. T. Ashcroft, A. K. Cheetham, M. L. H. Green and P. D. F. Vernon, Nature 352 (1991) 225.
43. J. T. Richardson and S. A. Paripatyadar, Appl. Catal 61(1990) 293.
44. I. M. Bodrov and L. O. Apel'baum, Kinet. Katal. 8 (1967) 379.
45. I. M. Bodrov and L. O. Apel'baum, Kinet. Katal. 5 (1964) 696.
46. M. A. Peña, J. P. Gomez and J. L. G. Fierro, Appl. Catal. A: Chemical 144 (1996) 7.
47. B. Frank, G. Emig and A. Renken, Appl. Catal. B: Envir. 19 (1998) 45.
48. R. Burch, M. D. Coleman, Appl. Catal. B. Envir. 23 (1999) 115.
49. A. Ueda, T. Nakao, M. Azuma and T. Kobayashi, Catal. Today 45 (1998) 135.
50. K. Yokota, M. Fukui and T. Tanaka, Appl. Surf. Sci 121/122 (1997) 273.
51. M. Machida, S. Ikeda, D. Kurogi and T. Kijima, Appl. Catal. B: Envir. 35 (2001) 107.
52. R. Burch, P. J. Millington and A. P. Walker Appl. Catal B. 4 (1994) 65.
53. M. Fukui and K. Yokata, Shokubai, Catalysts and Catalysis 36 (1994) 160.
54. C. N. Costa, V. N. Stathopoulos, V. C. Belessi and A. M. Efstathiou, J. Catal. 197 (2001) 350.
55. G. Centi, J. Mol. Catal. A: Chemical 173 (2001) 287.
56. B. Ramachandran, G. R. Herman, S. Choi, H. G. Stenger, C. E. Lyman and J. W. Sale, Catal. Today 55 (2000) 281.
57. R. Khodayari and C. U. I. Odenbrand, Appl. Catal. B: Envir. 33 (2001) 277.
58. K. Balakrishnan and R. D. Gonzalez, J. Catal. 144 (1993) 395.
59. C. N. Costa, P. G. Savva, C. Andronikou, G. Lambrou, K. Polychronopoulou, V. N. Stathopoulos, V. C. Belessi, P. J. Pomonis and A. M. Efstathiou, J. Catal. in press.
60. S. Galvano and G. Paravano, J. Catal. 55 (1978) 178.
61. S. Kikuyama, I. Matsukama, R. Kikuchi, K. Sasaki and K. Eguchi, Appl. Catal. A: General 219 (2001) 107.
62. S. Hodjati, C. Petit, V. Pitchon and A. Kiennemann, Appl. Catal. B: Envir. 30 (2001) 247.
63. V. C. Belessi, C. N. Costa, T. V. Bakas, T. Anastasiadou, A. M. Efstathiou and P. J. Pomonis, Catal. Today 59 (2000) 347.

The invention claimed is:

1. A catalyst comprising Pt in an amount of between 0.1 and 2 wt. % dispersed on a pre-sulphated mixed oxide support of Mg and Ce.

2. A catalyst in accordance with claim 1 wherein the metal content is 0.1% of Pt dispersed on the mixed oxide support of Mg and Ce.

3. A catalyst in accordance with claim 1 comprising Pt supported on a mixed oxide of 50% MgO and 50% $CeO_2$.

4. A catalyst in accordance with claim 1 further comprising more than one compound selected from the group consisting of Pt, MgO, $CeO_2$, $MgSO_4$ and $Ce_2(SO_4)_3$.

5. A process for preparing a catalyst comprising Pt in an amount of between 0.1 and 2 wt. % dispersed on a pre-sulphated mixed metal oxide support of Mg and Ce as defined in claim 1, said process comprising:
    impregnating a MgO and $CeO_2$ support with an aqueous solution containing $NH_4NO_3$,
    impregnating the MgO and $CeO_2$ support with an aqueous solution containing a sulphate precursor,
    impregnating the mixed sulphated MgO and CeO2 support with an aqueous solution of the platinum precursor,
    heating at 600° C. in a flow of air for at least 2 hours and reducing the catalyst in a flow of $H_2$ at 300° C. for at least 2 hours.

6. A process according to claim 5 further comprising:
    impregnating a MgO and $CeO_2$ support with an aqueous solution containing $NH_4NO_3$,
    evaporating water,
    drying of a resulting residue,
    sieving the residue,
    heating at 300° C. in the presence of air for 2 hours, impregnating the MgO and CeO₂ support with an aqueous solution containing a sulphate precursor,
evaporating water,
drying a resulting residue,
sieving the residue,
heating at 600° C. in the presence of air for 2 hours,
cooling to room temperature obtaining a mixed sulphated MgO and CeO₂ support,
impregnating the mixed sulphated MgO and CeO₂ support with an aqueous solution of the platinum precursor,
evaporating water,
drying the resulting residue,
sieving and heating to 600° C.,
heating at 600° C. in a flow of air for at least 2 hours, and
reducing the catalyst in a flow of H₂ at 300° C. for at least 2 hours.

7. A method of reducing a product selected from the group consisting of NO, NO₂, and a mixture of NO and NO₂ to N₂ gas using hydrogen as reducing agent in the presence of O₂ in the presence of a catalyst comprising Pt highly dispersed between 0.1 and 2 wt. % dispersed on a pre-sulphated mixed metal oxide support of Mg and Ce, as defined in claim 1.

8. A method in accordance with claim 7 wherein a reactor selected from the group consisting of a fixed bed reactor and a monolith type reactor is used.

\* \* \* \* \*